US009467902B2

(12) United States Patent
Ode

(10) Patent No.: US 9,467,902 B2
(45) Date of Patent: Oct. 11, 2016

(54) RADIO COMMUNICATION SYSTEM, BASE STATION APPARATUS, TERMINAL APPARATUS, AND RADIO COMMUNICATION METHOD IN RADIO COMMUNICATION SYSTEM

(75) Inventor: Takayoshi Ode, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 426 days.

(21) Appl. No.: 13/434,147

(22) Filed: Mar. 29, 2012

(65) Prior Publication Data
US 2012/0184316 A1 Jul. 19, 2012

Related U.S. Application Data

(63) Continuation of application No. PCT/JP2009/005100, filed on Oct. 2, 2009.

(51) Int. Cl.
H04W 72/00 (2009.01)
H04M 1/00 (2006.01)
H04W 28/20 (2009.01)
H04W 8/22 (2009.01)
H04W 72/04 (2009.01)
H04W 88/02 (2009.01)
H04W 88/08 (2009.01)

(52) U.S. Cl.
CPC .......... H04W 28/20 (2013.01); H04W 8/22 (2013.01); H04W 72/0406 (2013.01); H04W 72/0453 (2013.01); H04W 88/02 (2013.01); H04W 88/08 (2013.01)

(58) Field of Classification Search
USPC ........................................ 455/501, 509, 507
See application file for complete search history.

(56) References Cited

U.S. PATENT DOCUMENTS

| 5,592,470 A | 1/1997 | Rudrapatna et al. |
| 6,885,697 B1 * | 4/2005 | Tokunaga ............... H04L 5/143 370/329 |
| 7,245,879 B2 * | 7/2007 | Sadri ................... H04W 52/346 370/208 |
| 7,290,064 B2 * | 10/2007 | Patel et al. .................... 709/250 |

(Continued)

FOREIGN PATENT DOCUMENTS

| EP | 1 718 010 A2 | 11/2006 |
| EP | 2 081 395 A1 | 7/2009 |

(Continued)

OTHER PUBLICATIONS

3GPP TS25,306V212V5.15.0; 3rd Generation Partnership Project; Technical Specification Group Radio Access Network; "UE Radio Access capabilities"; (Release 5); Mar. 2009.

(Continued)

Primary Examiner — Tilahun B Gesesse
(74) Attorney, Agent, or Firm — Myers Wolin, LLC

(57) ABSTRACT

A radio communication system, includes a base station apparatus; and a terminal apparatus, wherein radio communication is performed between the base station apparatus and terminal apparatus, the terminal apparatus includes: a required time notification signal generation unit which generates a required time notification signal indicating a required time for change of a transmission bandwidth or a reception bandwidth to the base station apparatus; and a transmission unit which transmits the required time notification signal, and the base station apparatus includes a reception unit which receives the required time notification signal.

20 Claims, 25 Drawing Sheets

(56) References Cited

U.S. PATENT DOCUMENTS

| | | | | |
|---|---|---|---|---|
| 7,292,824 | B2* | 11/2007 | Yamaguchi | H04W 72/08 455/452.2 |
| 7,342,973 | B2* | 3/2008 | Walker | H03K 3/0315 370/441 |
| 7,352,767 | B2* | 4/2008 | Jang | H04L 5/023 370/328 |
| 7,953,167 | B2* | 5/2011 | Ode | H04L 5/0007 370/329 |
| 8,165,245 | B2* | 4/2012 | Park et al. | 375/297 |
| 8,363,610 | B2* | 1/2013 | Ode | H04L 5/0007 370/329 |
| 8,649,815 | B2* | 2/2014 | Yokoyama | 455/522 |
| 8,681,721 | B2* | 3/2014 | Furuskar et al. | 370/329 |
| 8,705,480 | B2* | 4/2014 | Ode | H04L 5/0007 370/208 |
| 2004/0264501 | A1* | 12/2004 | Zalitzky et al. | 370/468 |
| 2005/0159162 | A1 | 7/2005 | Park | |
| 2009/0147737 | A1 | 6/2009 | Tacconi et al. | |
| 2009/0201876 | A1 | 8/2009 | Morimoto et al. | |
| 2009/0213806 | A1 | 8/2009 | Ode | |
| 2009/0219873 | A1 | 9/2009 | Higushi et al. | |
| 2009/0247180 | A1* | 10/2009 | Higuchi et al. | 455/452.2 |

FOREIGN PATENT DOCUMENTS

| | | |
|---|---|---|
| JP | 08-280058 | 10/1996 |
| JP | 2006-311475 | 11/2006 |
| JP | 2007-511163 | 4/2007 |
| JP | 2007-151056 | 6/2007 |
| JP | 2007-300505 | 11/2007 |
| WO | 2008/016885 A2 | 2/2008 |
| WO | 2008/056425 | 5/2008 |

OTHER PUBLICATIONS

3GPP TR 36.814V1.3.0; 3rd Generation Partnership Project; Technical Specification Group Radio Access Network; "Further Advancements for E-UTRA Physical Layer Aspects" (Release 9) Jun. 2009.

Ericsson; "Carrier aggregation in LTE-Advanced";R1-082468, dated Jun. 30-Jul. 4, 2008.

International Search Report issued for corresponding International Patent Application No. PCT/JP2009/005100, mailed Dec. 22, 2009.

Extended European search report with the supplementary European search report and the European search opinion issued for corresponding European Patent Application No. 09850012.7 dated Nov. 20, 2015.

* cited by examiner

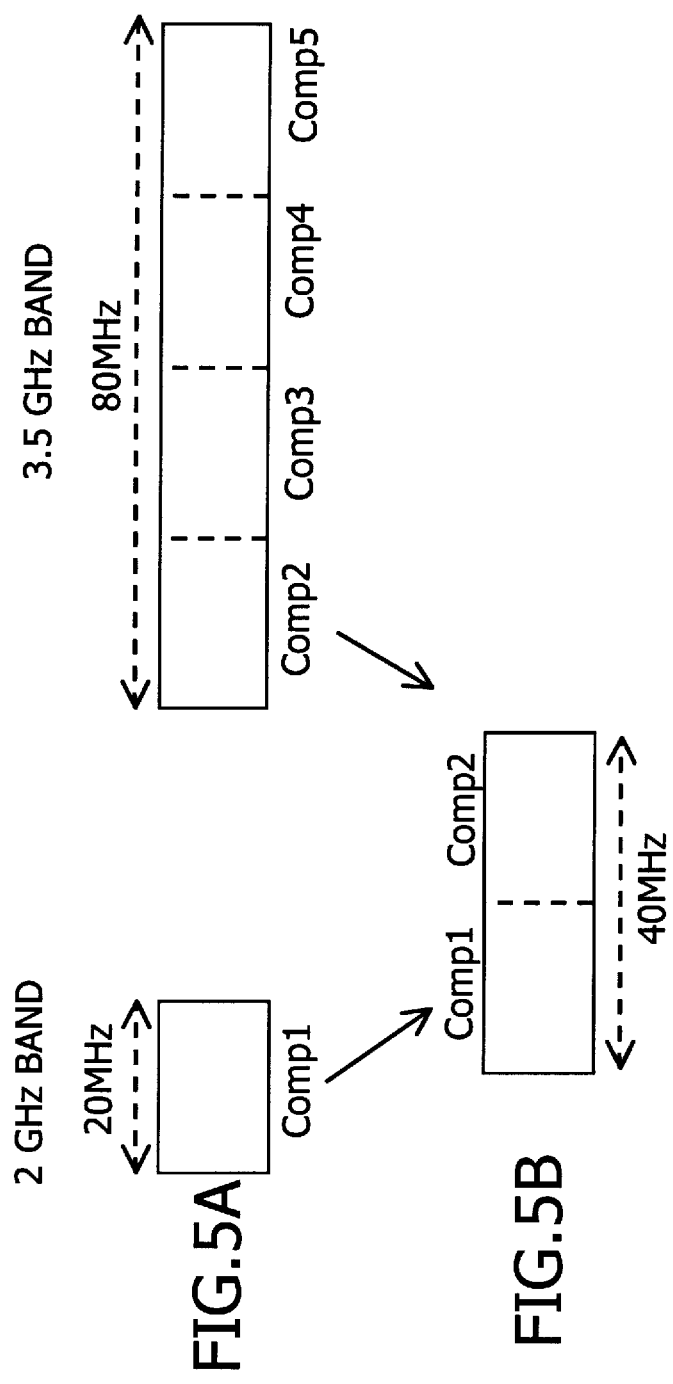

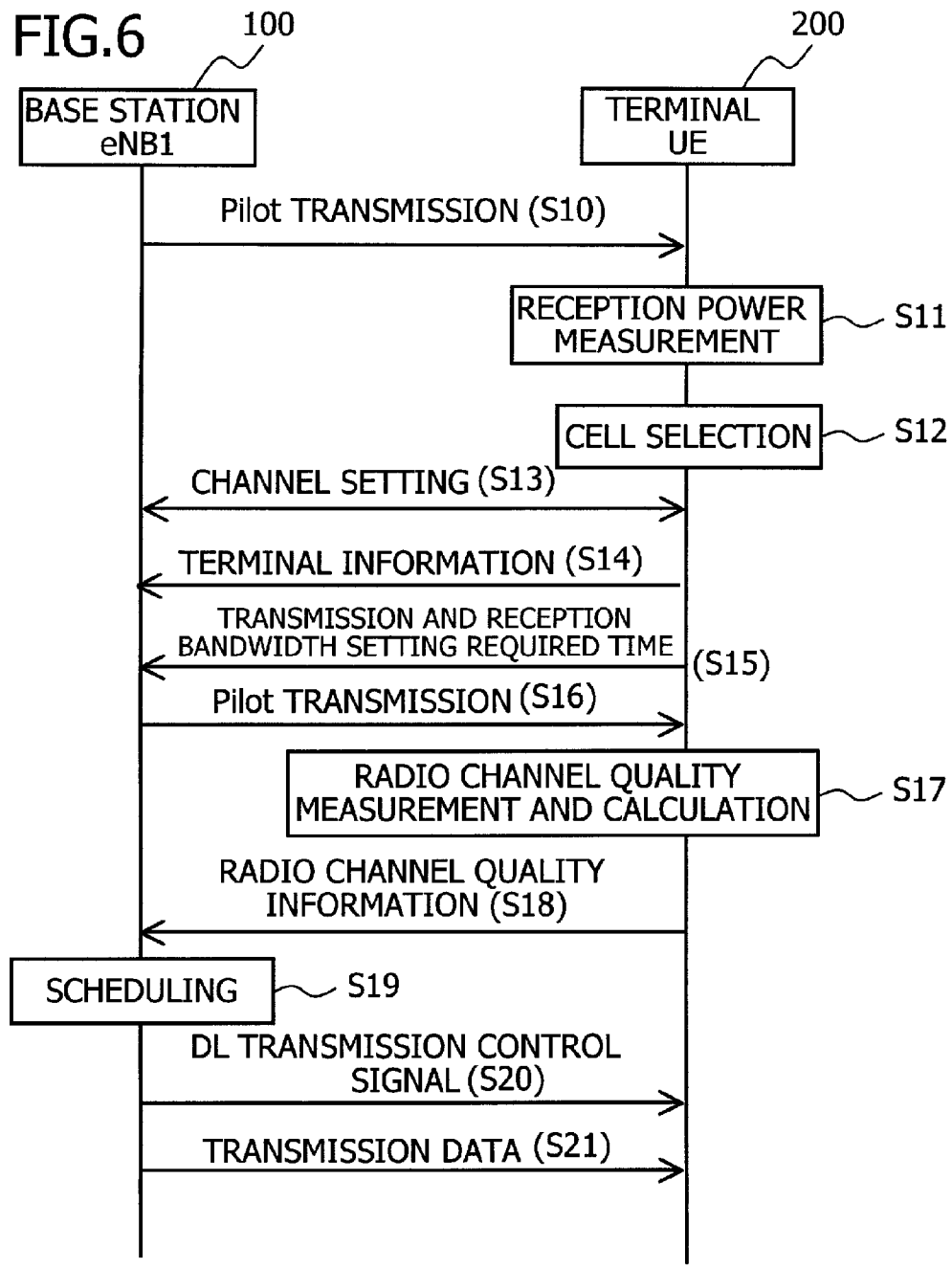

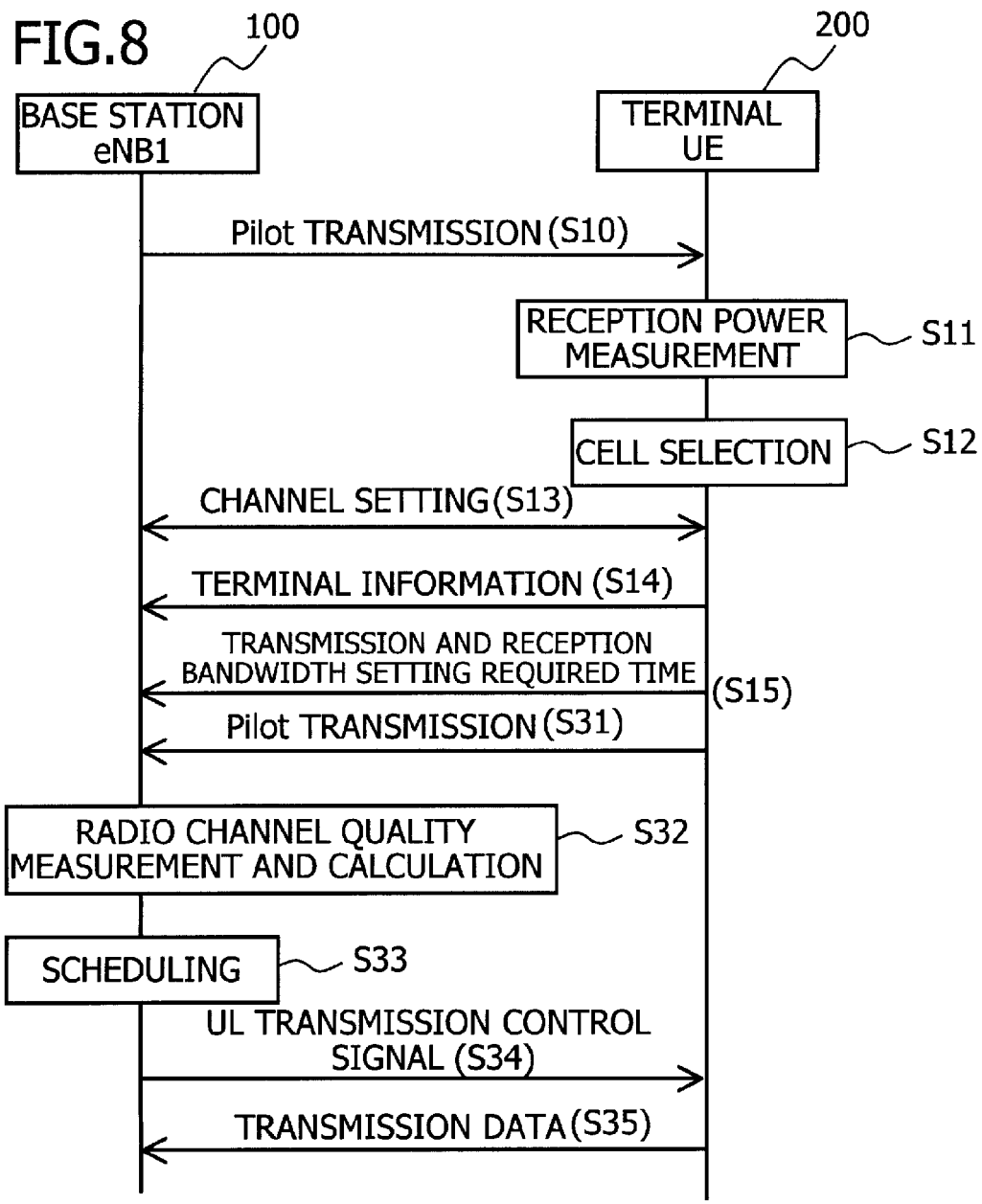

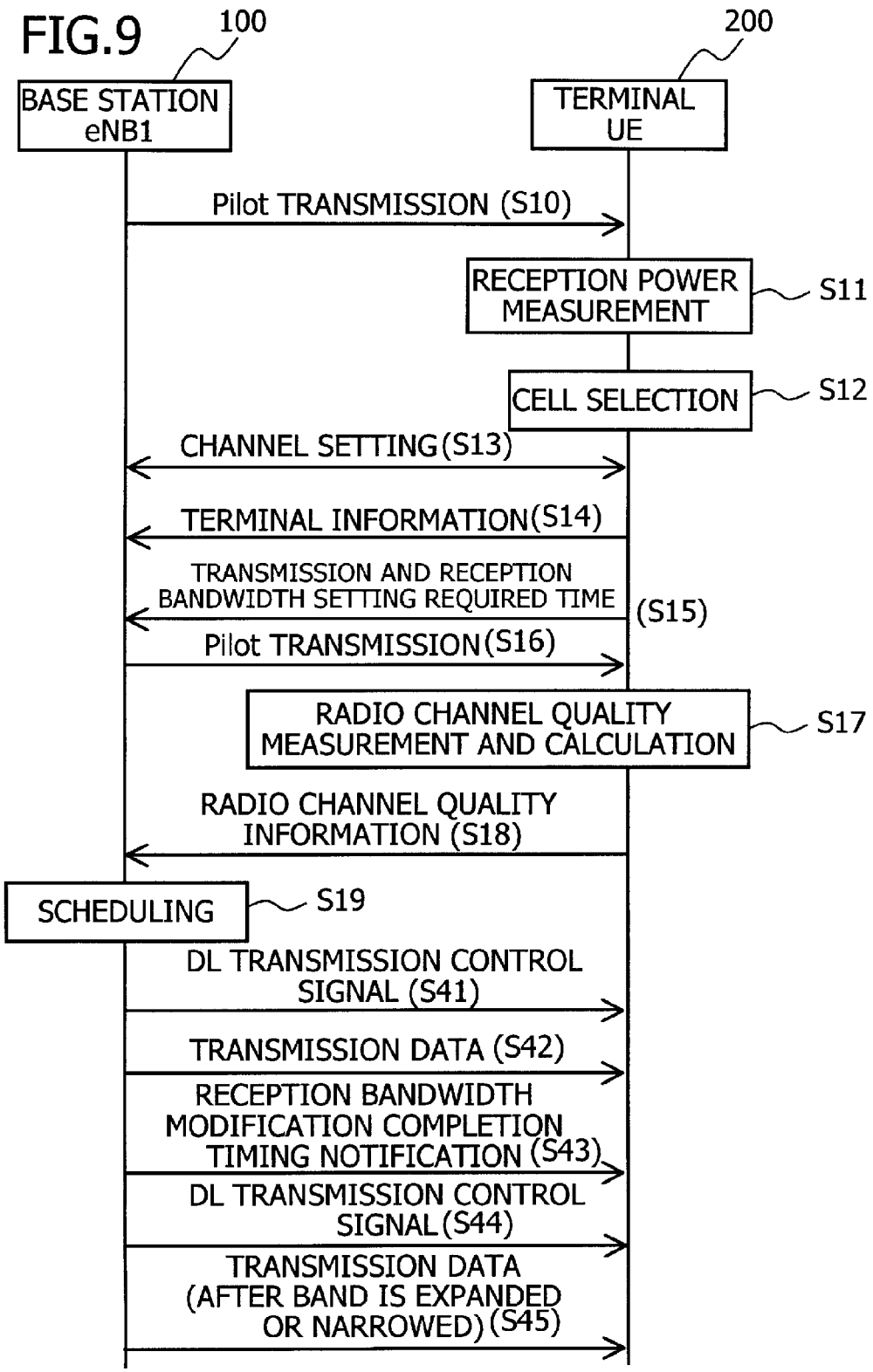

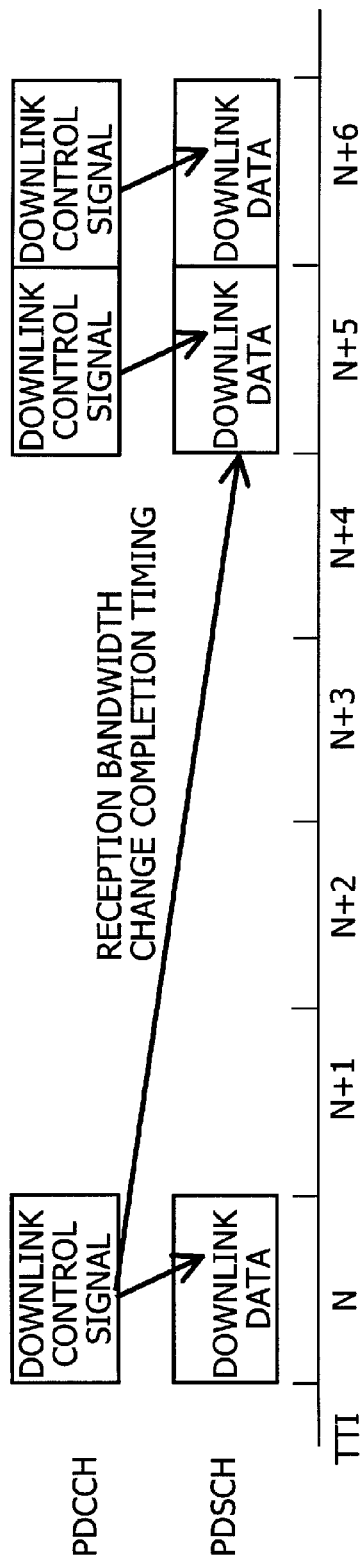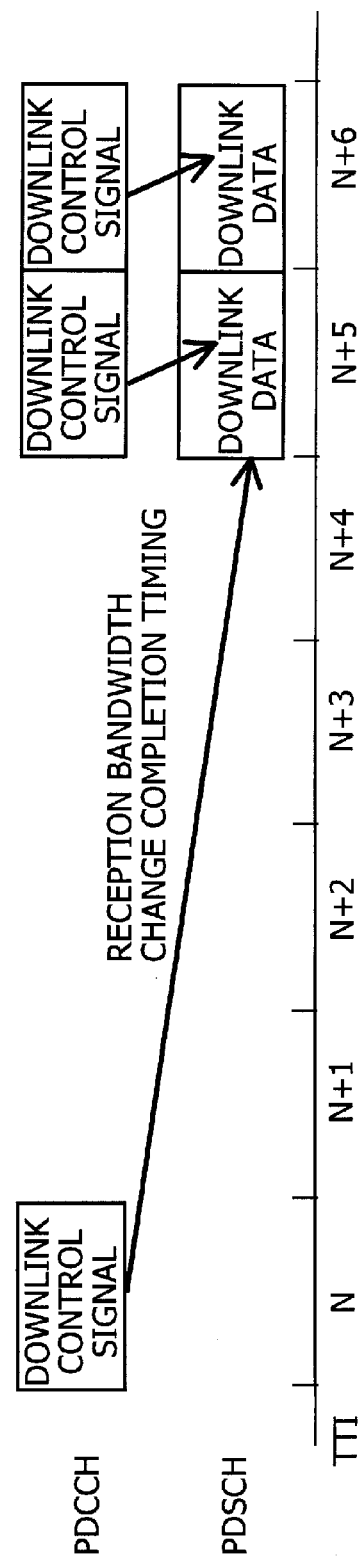

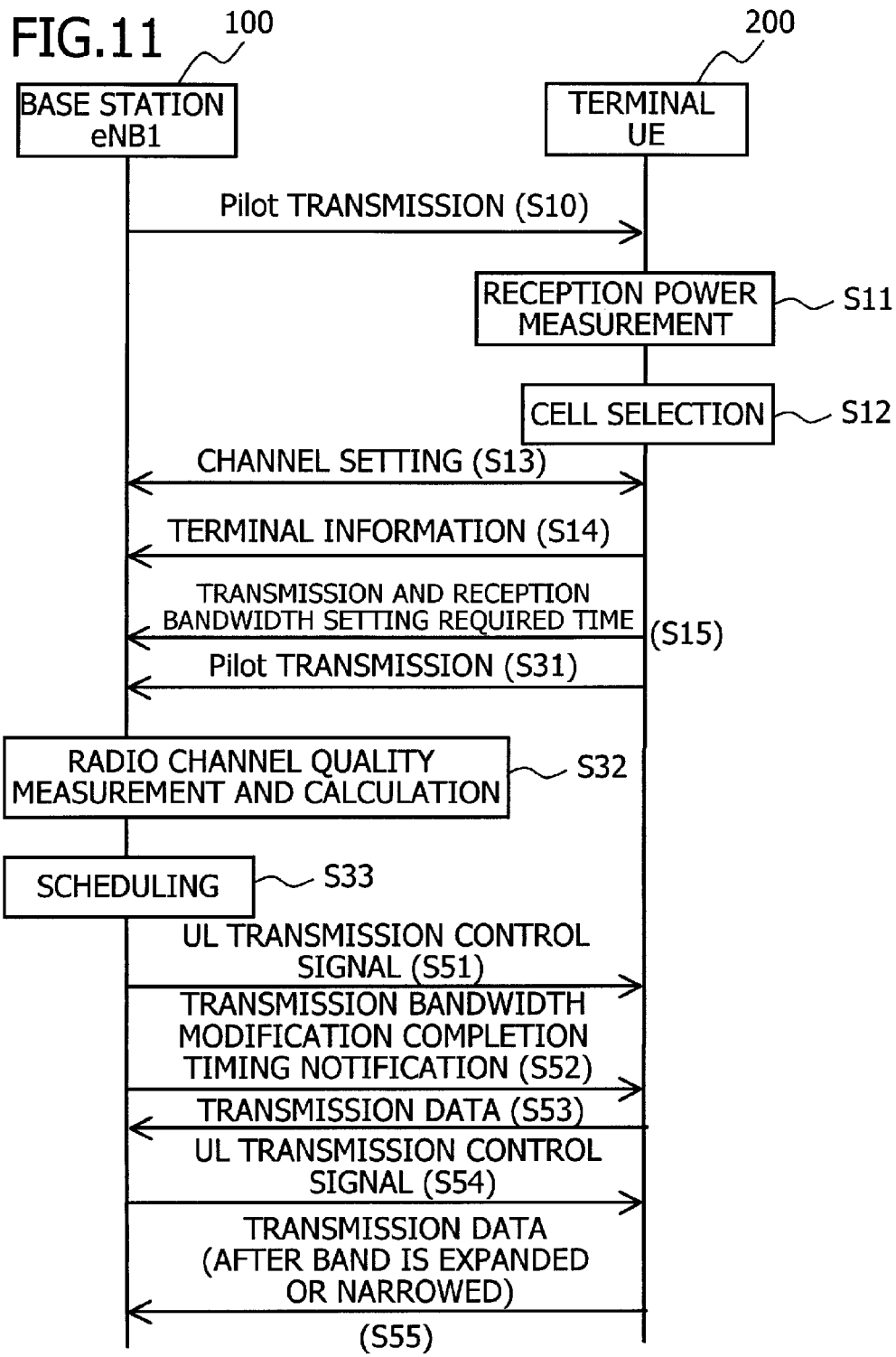

FIG.13A

|  | Rx | Tx | CHANGE TIME |
|---|---|---|---|
| CATEGORY 1 | 10M | 5M | $T_1$ |
| CATEGORY 2 | 10M | 10M | $T_1$ |
| CATEGORY 3 | 20M | 5M | $T_1$ |
| CATEGORY 4 | 20M | 10M | $T_1$ |
| CATEGORY 5 | 20M | 15M | $T_2$ |
| CATEGORY 6 | 20M | 20M | $T_3$ |
| ⋮ | ⋮ | ⋮ | ⋮ |

FIG.13B

|  | Rx | Tx | CHANGE TIME |
|---|---|---|---|
| CATEGORY 1 | 10M | 5M | $T_1$ |
| CATEGORY 2 | 10M | 10M | $T_{10}$ |
| CATEGORY 3 | 10M | 10M | $T_{11}$ |
| CATEGORY 4 | 10M | 10M | $T_{12}$ |
| ⋮ | ⋮ | ⋮ | ⋮ |

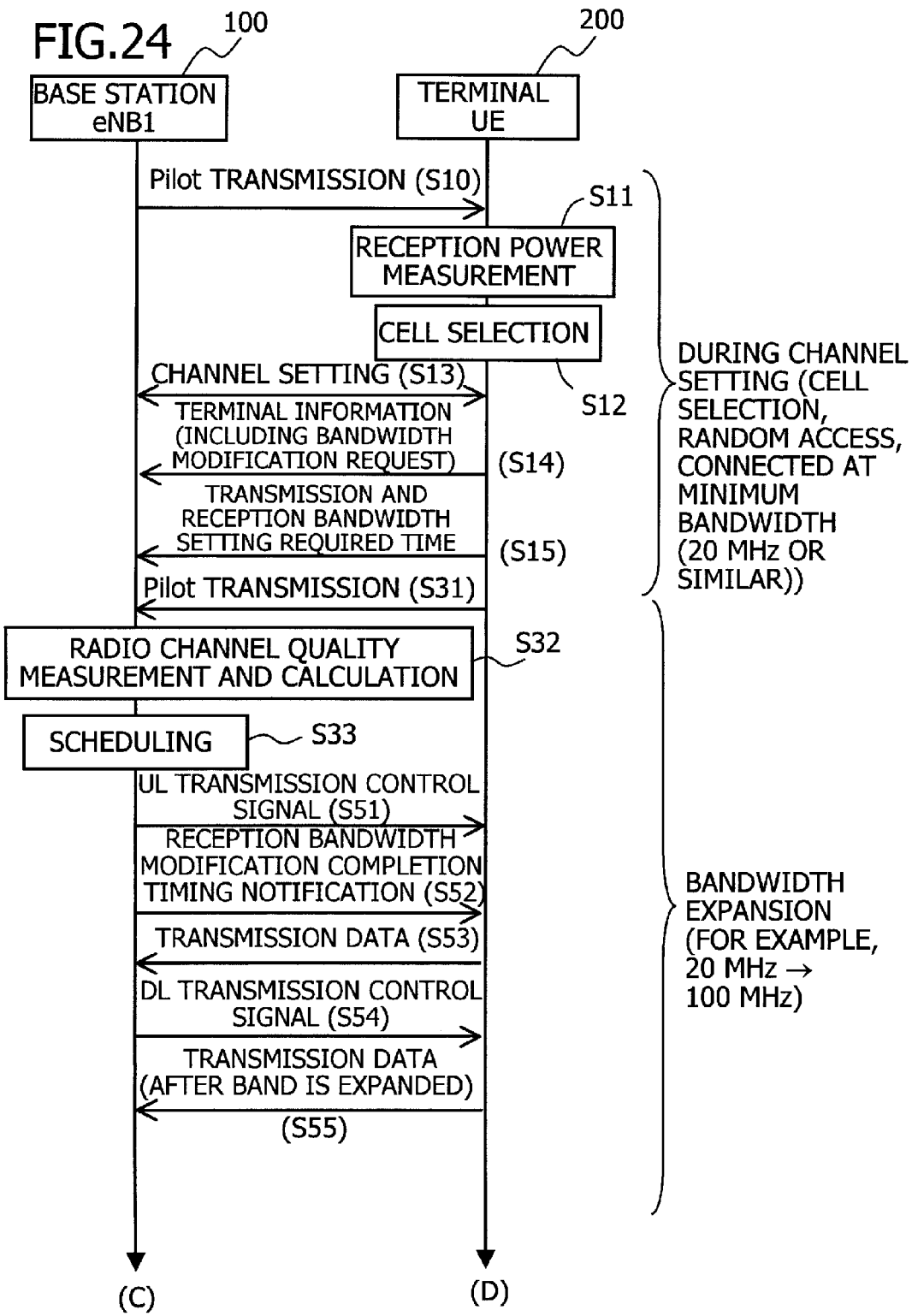

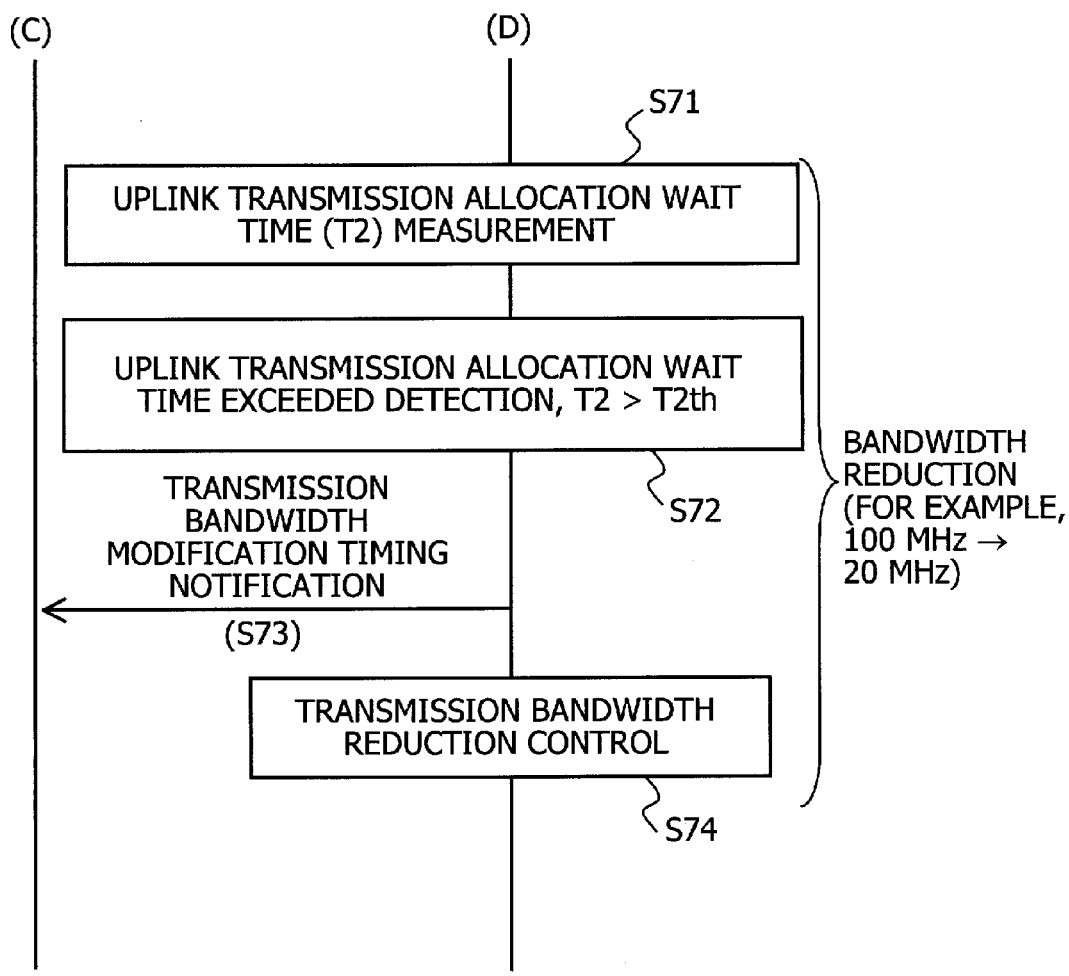

RADIO COMMUNICATION SYSTEM, BASE STATION APPARATUS, TERMINAL APPARATUS, AND RADIO COMMUNICATION METHOD IN RADIO COMMUNICATION SYSTEM

CROSS REFERENCE TO RELATED APPLICATION

This application is a continuation of International Application No. PCT/JP2009/005100, filed on Oct. 2, 2009, now pending, the contents of which are herein wholly incorporated by reference.

TECHNICAL FIELD

The embodiments discussed herein are related to a radio communication system, base station apparatus, terminal apparatus, and radio communication method in the radio communication system.

BACKGROUND ART

In the prior art there is a technique in radio communication systems called aggregation (see for example Non-patent References 1 and 2 below). Aggregation is a technique in which, for example, divided frequency bands (also called components) are combined into a band with broad bandwidth. Aggregation includes carrier aggregation, in which components in the same frequency bands (for example the 3.5 GHz band) are combined, and spectrum aggregation, in which components in different frequency bands (for example the 3.5 GHz band and the 2 GHz band) are combined.

As a conventional technique in a radio communication system, a technique regarding time intervals from the initial HS-DSCH (High-Speed Downlink Shared Channel) transmission to the next HS-DSCH transmission is disclosed (see for example Non-patent Reference 3 below).

Further, a conventional technique is disclosed in which a communication apparatus includes random access channel generation means for generating a random access channel formed from a preamble portion including at least a portion of control information, and transmission means for allocating to each user one among continuous frequency allocations and discontinuous combtooth frequency allocations, and for transmitting the random access channel using a variable multi-bandwidth (see for example Patent Reference 1 below).

Patent Reference 1: Japanese Laid-open Patent Publication No. 2006-311475
Non-patent Reference 1: 3GPP TR 36.814V1.3.0 (2009-June)
Non-patent Reference 2: R1-082468
Non-patent Reference 3: 3GPP TS 25.306V5.15.0 (2009-March)

DISCLOSURE OF THE INVENTION

Problems to be Solved by the Invention

For example, when a terminal apparatus set to receive with bandwidth of 100 MHz receives data from a base station apparatus with bandwidth of 20 MHz, the terminal apparatus performs bandwidth modification processing. In this case, the terminal apparatus power consumption is increased by an amount corresponding to being set to receive at 100 MHz compared with a case of being set to receive at 20 MHz. Moreover, there are cases in which the terminal apparatus cannot receive the relevant data while performing bandwidth modification processing even when data is transmitted from the base station apparatus. Consequently radio resources are wasted.

Further, in the above-described Non-patent Reference 3 and Patent Reference 1, there is no disclosure regarding the time required by the terminal apparatus for bandwidth modification. Hence when bandwidth modification processing such as that described above is performed, the power consumption of the terminal apparatus is increased, and radio resources are wasted.

Accordingly, it is an object in one aspect of the invention to provide a radio communication system, terminal apparatus, base station apparatus, and radio communication method in a radio communication system, which enable reduction of power consumption.

Furthermore, it is an object in one aspect of the invention to provide a radio communication system, terminal apparatus, base station apparatus, and radio communication method in a radio communication system, which enable effective utilization of radio resources.

Means for Solving the Problem

According to an aspect of the invention, a radio communication system, includes a base station apparatus; and a terminal apparatus, wherein radio communication is performed between the base station apparatus and terminal apparatus, the terminal apparatus includes: a required time notification signal generation unit which generates a required time notification signal indicating a required time for change of a transmission bandwidth or a reception bandwidth to the base station apparatus; and a transmission unit which transmits the required time notification signal, and the base station apparatus includes a reception unit which receives the required time notification signal.

Effectiveness of the Invention

A radio communication system, terminal apparatus, base station apparatus, and radio communication method in a radio communication system which can reduce power consumption can be provided. A radio communication system, terminal apparatus, base station apparatus, and radio communication method in a radio communication system which enable effective utilization of radio resources can be provided.

BRIEF DESCRIPTION OF THE DRAWINGS

FIG. 5A and FIG. 5B illustrate examples of aggregation;
FIG. 6 is a sequence diagram illustrating an operation example;
FIG. 8 is a sequence diagram illustrating an operation example;

FIG. 9 is a sequence diagram illustrating an operation example;

FIG. 10A and FIG. 10B illustrate examples of reception bandwidth modification completion timing;

FIG. 11 is a sequence diagram illustrating an operation example;

FIG. 13A and FIG. 13B illustrate examples of the configuration of tables including categories;

FIG. 24 is a sequence diagram illustrating an operation example; and

FIG. 25 is a sequence diagram illustrating an operation example.

BEST MODE FOR CARRYING OUT THE INVENTION

Embodiments of the invention are explained below.

First Example

Figure 1:
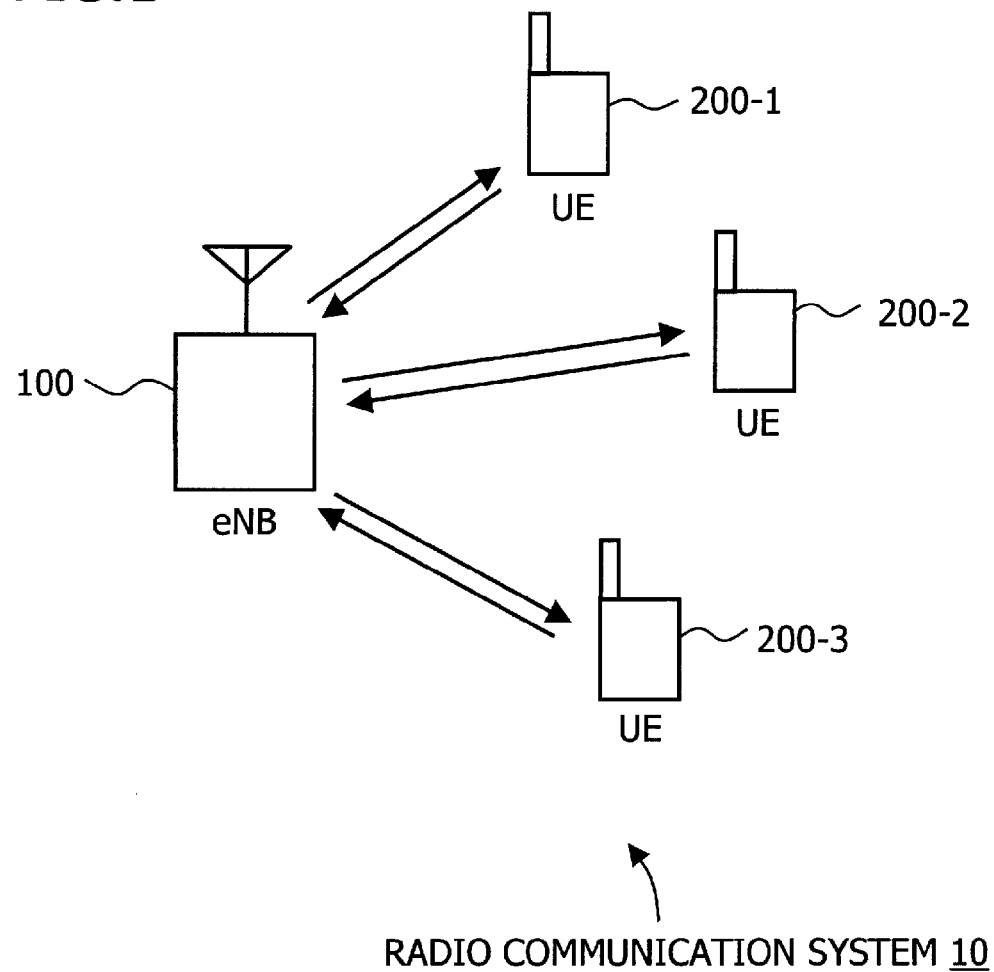
FIG. 1 illustrates an example of the configuration of a radio communication system.

A first example is explained. FIG. 1 illustrates an example of the configuration of a radio communication system 10. The radio communication system 10 includes a base station apparatus (eNB: evolved Node_B, hereafter "base station") 100, and terminal apparatuses (UE: User Equipment, hereafter "terminals") 200-1 to 200-3. The base station 100 can transmit data to the terminals 200-1 to 200-3 (downlinks), and the terminals 200-1 to 200-3 can also transmit data to the base station 100 (uplink direction). The terminal 200 may be a single terminal, or may be a plurality of terminals.

Figure 2:
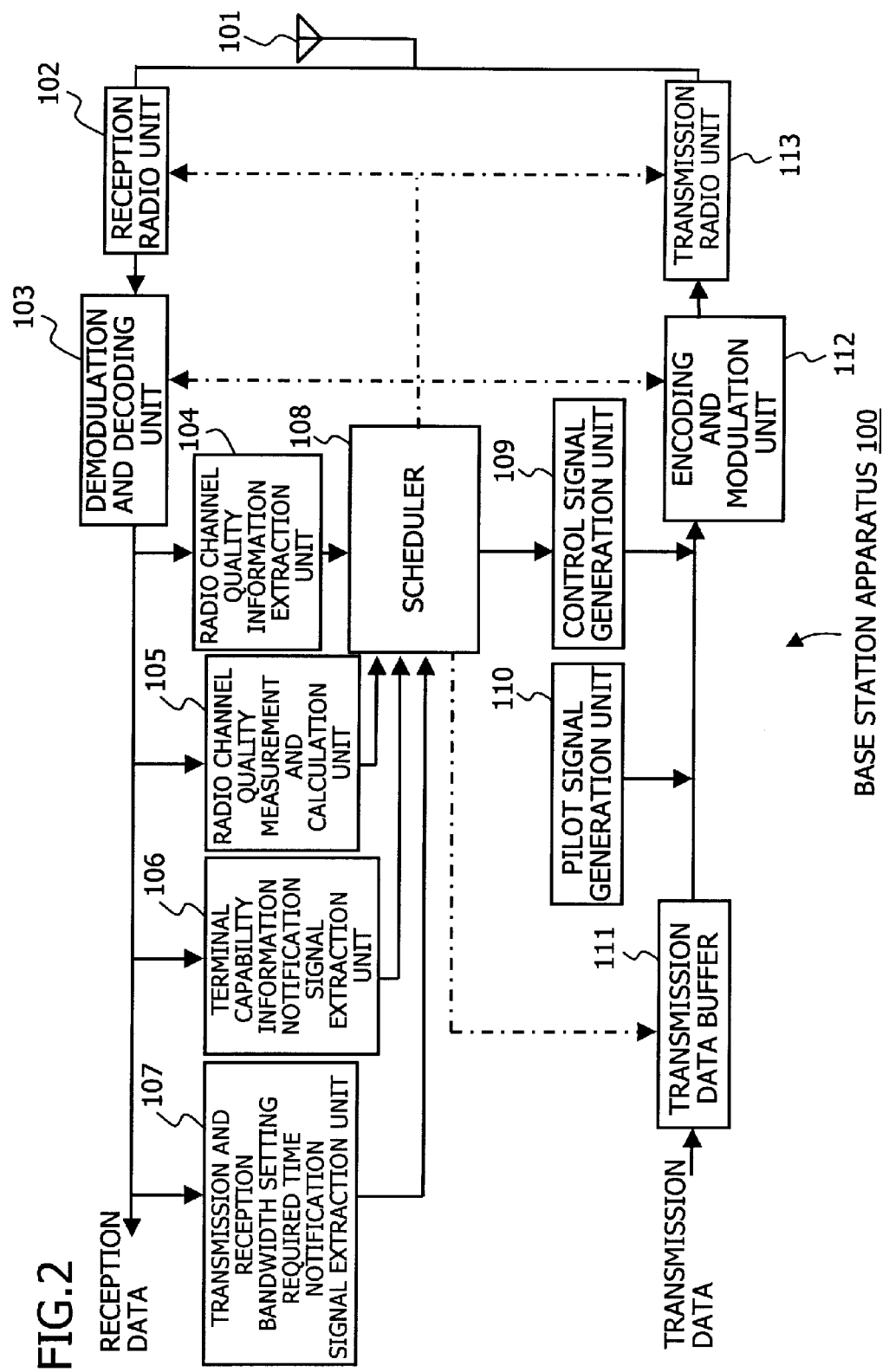
FIG. 2 illustrates an example of the configuration of a base station apparatus.

FIG. 2 illustrates an example of the configuration of a base station 100. The base station 100 includes an antenna 101, reception radio unit 102, demodulation and decoding unit 103, radio channel quality information extraction unit 104, radio channel quality measurement and calculation unit 105, terminal capability information notification signal extraction unit 106, transmission and reception bandwidth setting required time notification signal extraction unit (hereafter "required time notification signal extraction unit") 107, scheduler 108, control signal generation unit 109, pilot signal generation unit 110, transmission data buffer 111, encoding and modulation unit 112, and transmission radio unit 113.

The antenna 101 transmits and receives radio signals to and from a terminal 200.

The reception radio unit 102 performs downconversion and other processing of a radio signal output from the antenna 101, and outputs the result, as a received signal, to the demodulation and decoding unit 103.

The demodulation and decoding unit 103 performs demodulation processing, decoding processing and similar of a received signal based on the modulation method, coding rate and similar scheduled by the scheduler 108.

The radio channel quality information extraction unit 104 extracts radio channel quality information (for example, a CQI (Channel Quality Indicator)) from a received signal output from the demodulation and decoding unit 103, and outputs the result to the scheduler 108.

The radio channel quality measurement and calculation unit 105 extracts for example a pilot signal (or a known signal) from a received signal output from the demodulation and decoding unit 103, and based on the pilot signal measures and calculates the uplink-direction radio channel quality. The radio channel quality measurement and calculation unit 105 outputs the calculated radio channel quality information to the scheduler 108.

The terminal capability information notification signal extraction unit 106 extracts a terminal capability information notification signal from a received signal output from the demodulation and decoding unit 103, and outputs terminal information to the scheduler 108.

The required time notification signal extraction unit 107 extracts a transmission and reception bandwidth setting required time notification signal (hereafter "required time notification signal") from a received signal output from the demodulation and decoding unit 103, and outputs a transmission and reception bandwidth setting required time to the scheduler 108.

The scheduler 108 performs scheduling based on radio channel quality information items, terminal capability information, and the transmission and reception bandwidth setting required time. For example, the scheduler 108 decides the coding rate and modulation method, or allocates radio resources and similar, for downlink-direction data and similar based on the radio channel quality information output from the radio channel quality information extraction unit 104, terminal capability information, and the transmission and reception bandwidth setting required time. Further, the scheduler 108 decides the coding rate and similar for uplink-direction data and similar based on radio channel quality information output from the radio channel quality measurement and calculation unit 105, terminal capability information, and the transmission and reception bandwidth setting required time.

The control signal generation unit 109 takes as inputs from the scheduler 108 the coding rate, modulation method, and other scheduling information and similar scheduled by the scheduler 108, and generates a control signal based on relevant scheduling information. The control signal generation unit 109 outputs the generated control signal to the encoding and modulation unit 112.

The pilot signal generation unit 110 generates a pilot signal and outputs the signal to the encoding and modulation unit 112.

The transmission data buffer 111 stores transmission data. For example, the scheduler 108 reads out transmission data from the transmission data buffer 111 with scheduled timing, and outputs the data to the encoding and modulation unit 112.

The encoding and modulation unit 112 performs encoding and modulation processing of transmission data and similar using the coding rate, modulation method and similar decided by the scheduler 108. The encoding and modulation unit 112 may also perform encoding and similar of a pilot signal and control signal.

The transmission radio unit 113 performs upconversion and other processing of the transmission data output from the encoding and modulation unit 112, pilot signals and control signals. The transmission radio unit 113 outputs the result as radio signals to the antenna 101. Radio signals are transmitted to the terminal 200.

Figure 3:
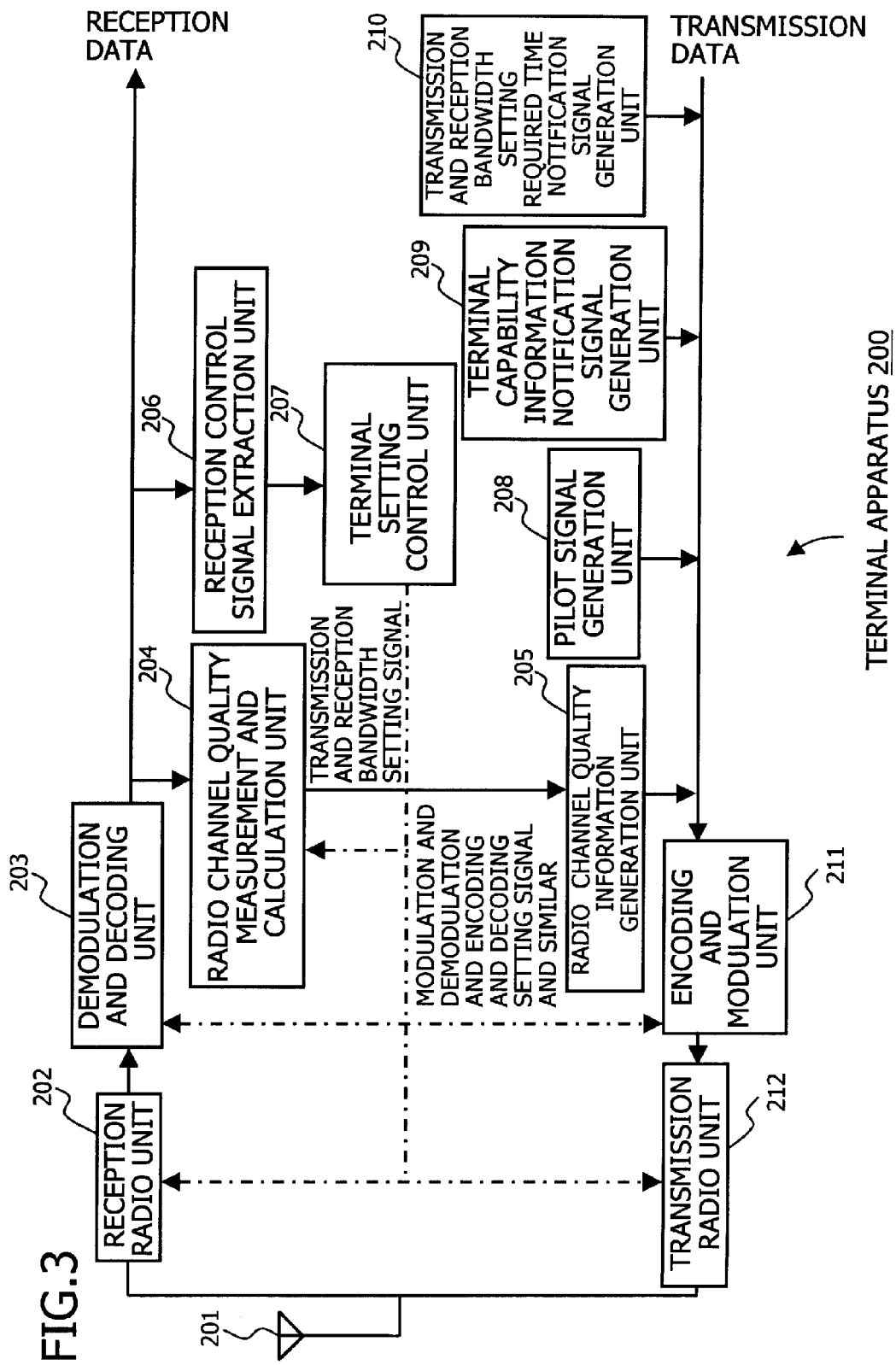
FIG. 3 illustrates an example of the configuration of a terminal apparatus.
Figure 4A:
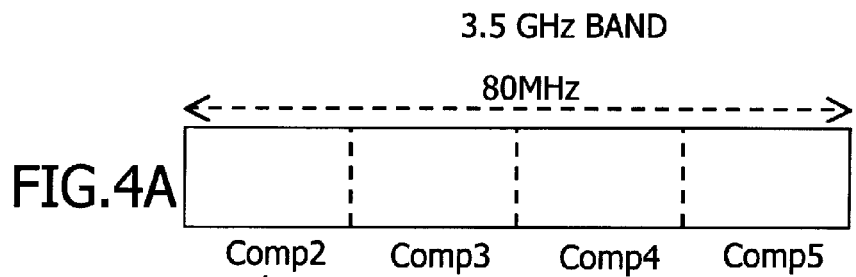
FIG. 4A to FIG. 4D illustrate examples of aggregation.
Figure 4B:
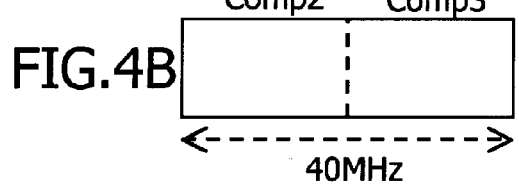
Figure 4C:
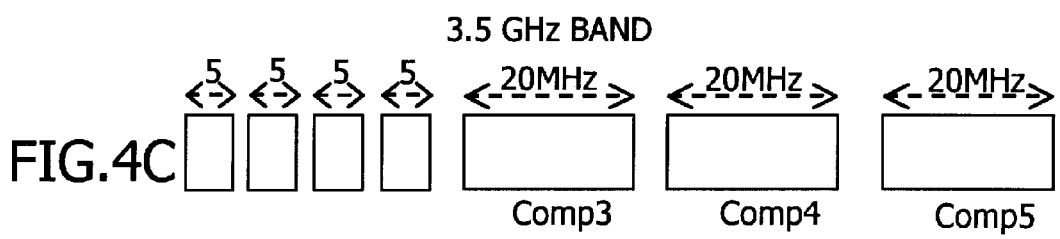
Figure 4D:
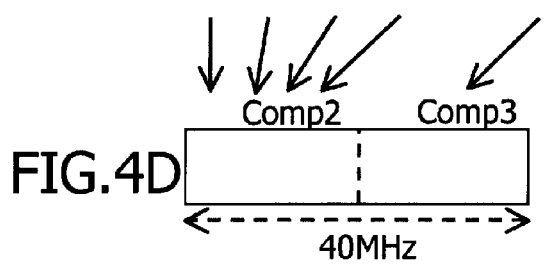

FIG. 3 illustrates an example of the configuration of the terminal 200. The terminal 200 includes an antenna 201, reception radio unit 202, demodulation and decoding unit 203, radio channel quality measurement and calculation unit 204, radio channel quality information generation unit 205, reception control signal extraction unit 206, terminal setting control unit 207, pilot signal generation unit 208, terminal capability information notification signal generation unit 209, transmission and reception bandwidth setting required time notification signal generation unit (hereafter "required time notification signal generation unit") 210, encoding and modulation unit 211, and transmission radio unit 212.

The antenna 201 transmits and receives radio signals to and from the base station 100.

The reception radio unit 202 performs downconversion and other processing of a radio signal received by the antenna 201 based on the transmission and reception bandwidth setting signal and similar output from the terminal setting control unit 207, and outputs the result as a received signal to the demodulation and decoding unit 203.

The demodulation and decoding unit 203 performs demodulation and decoding processing and similar of a received signal based on modulation and demodulation and encoding and decoding setting signals output from the terminal setting control unit 207.

The radio channel quality measurement and calculation unit 204 extracts a pilot signal and similar from among a received signal output from the demodulation and decoding unit 203, and based on the pilot signal and similar, measures and calculates downlink-direction radio channel quality. The radio channel quality measurement and calculation unit 204 outputs the calculated radio channel quality to the radio channel quality information generation unit 205.

The radio channel quality information generation unit 205 generates radio channel quality information based on radio channel quality, and outputs the result to the encoding and modulation unit 211.

The reception control signal extraction unit 206 extracts a control signal from a received signal output from the demodulation and decoding unit 203, and outputs the signal to the terminal setting control unit 207.

The terminal setting control unit 207 controls the reception radio unit 202, demodulation and decoding unit 203, encoding and modulation unit 211, and transmission radio unit 212 such that for example modulation, encoding and similar are performed using a modulation method, coding rate and similar based on scheduling information included in a control signal. The terminal setting control unit 207 executes control by for example outputting a transmission and reception bandwidth setting signal, modulation and demodulation and encoding and decoding setting signals to the reception radio unit 202 and similar.

The pilot signal generation unit 208 generates a pilot signal and outputs the signal to the encoding and modulation unit 211.

The terminal capability information notification signal generation unit 209 generates a terminal capability information notification signal indicating terminal information, and outputs the signal to the encoding and modulation unit 211. Terminal information is information relating to the capability of the terminal 100, such as for example the maximum transmission and reception bandwidth of the terminal 200, frequency bands which can be used in transmission and reception, and similar. Terminal information may be held in advance in the terminal capability information notification signal generation unit 209, or may be held in other memory of the terminal 200.

The required time notification signal generation unit 210 generates a required time notification signal indicating a transmission and reception bandwidth setting required time, and outputs the relevant signal to the encoding and modulation unit 211. The transmission and reception bandwidth setting required time indicates for example the time for bandwidth modification processing in the terminal 200. For example, the reception radio unit 202 and demodulation and decoding unit 203 include a reception oscillator, amplifier, analog or digital filter, AD conversion unit, FFT (Fast Fourier Transform), and similar. The time for modification of the bandwidth includes, for example, all the times needed for oscillation frequency modification in the reception oscillator, modification of the frequency characteristic of the analog filter or similar, modification of the input clock of the AD conversion unit, modification of the FFT bandwidth (FFT number of points), and similar. The transmission and reception bandwidth setting required time may for example be held in the required time notification signal generation unit 210, or may be held in other memory of the terminal 200.

The encoding and modulation unit 211 performs encoding and modulation processing of transmission data and similar based on modulation and demodulation and encoding and decoding setting signals and similar. The encoding and modulation unit 211 may perform encoding of a pilot signal, terminal capability information notification signal, and required time notification signal as well.

The transmission radio unit 212 performs upconversion and similar processing of transmission data and similar output from the encoding and modulation unit 211 based on the transmission and reception bandwidth setting signal and similar, and outputs the result to the antenna 201 as a radio signal. The radio signal is transmitted to the base station 100.

Next, operation is explained. In this example, it is assumed that the base station 100 uses a broad bandwidth, for example 100 MHz or similar, by so-called aggregation. FIG. 4A to FIG. 4D illustrate the manner in which a bandwidth of "40 MHz" is used from a plurality of components in the frequency band which is the "3.5 GHz band". Apart from such carrier aggregation, the base station 100 may for example use a broad bandwidth by spectrum aggregation, as illustrated in FIG. 5A and FIG. 5B.

FIG. 6 is a sequence diagram illustrating an operation example. First the base station 100 transmits a pilot signal to the terminal 200 (S10). For example, the pilot signal generation unit 110 generates a pilot signal, which is transmitted to the terminal 200.

Next, the terminal 200 measures the reception power of the pilot signal (S11), and selects the connection target cell (or base station 100) (S12).

Next, the terminal 200 and the connection target base station 100 transmit and receive signals to make channel settings (S13).

Next, the terminal 200 transmits terminal information to the base station 100 (S14). For example, the terminal capability information notification signal generation unit 209 generates a terminal capability information notification signal, and transmits the signal as terminal information to the base station 100 via the encoding and modulation unit 211 and similar. For example, when the transmission or reception (or both transmission and reception) bandwidth is modified in the terminal 200, the terminal capability information notification signal generation unit 209 transmits information relating to the bandwidth after modification (for example, 20 MHz or similar), the maximum transmission and reception bandwidth of the terminal 200, and similar as terminal information.

Next, the terminal 200 transmits the transmission and reception bandwidth setting required time to the base station 100 (S15). For example, the transmission and reception bandwidth setting required time is transmitted to the base station 100 by means of output by the required time notification signal generation unit 210 of a required time notification signal.

Next, the base station 100 transmits a pilot signal to the terminal 200 (S16).

Next, the terminal 200 measures and calculates the radio channel quality based on the received pilot signal (S17). For example, the radio channel quality measurement and calculation unit 204 measures and calculates the radio channel quality.

Next, the terminal 200 transmits radio channel quality information to the base station 100 (S18). For example, the radio channel quality information generation unit 205 generates radio channel quality information and transmits the information via the encoding and modulation unit 211.

Next, the base station 100 performs scheduling based on radio channel quality information (S19). For example, the scheduler 108 performs scheduling of downlink-direction data transmission and similar based on radio channel quality information extracted by the radio channel quality information extraction unit 104. At this time, for example, the scheduler 108 performs scheduling such that control signals, transmission data and similar are not transmitted to the terminal 200 which performs bandwidth modification during the interval of the transmission and reception bandwidth setting required time. Or, the scheduler 108 may ensure that transmission allocation to the terminal 200 is not performed during the interval of the transmission and reception bandwidth setting required time.

By this means, for example, the base station 100 does not transmit transmission data, control signals or similar to the terminal 200 during the interval of the transmission and reception bandwidth setting required time (S15). Further, the terminal 200 can stop reception processing during this interval and perform bandwidth modification processing. As bandwidth modification processing, for example the terminal 200 modifies the oscillation frequency in the transmission and reception oscillator, modifies the frequency characteristics of the analog or digital filter or similar, modifies the input clock of the AD conversion unit, modifies the FFT bandwidth (FFT number of points), and similar, to perform bandwidth modification processing. For example, after the terminal 200 transmits radio channel quality information (S18), the terminal setting control unit 207 performs bandwidth modification processing of the reception radio unit 202 or demodulation and decoding unit 203 during the interval of the transmission and reception bandwidth setting required time which is held.

The base station 100 does not for example modify the bandwidth in order to transmit and receive data to and from the terminal apparatus 200 during the interval of the transmission and reception bandwidth setting required time or a constant period which takes this time into consideration. For example, the scheduler 108 controls the unit 103 and similar such that the bandwidth is not modified.

Figure 7:
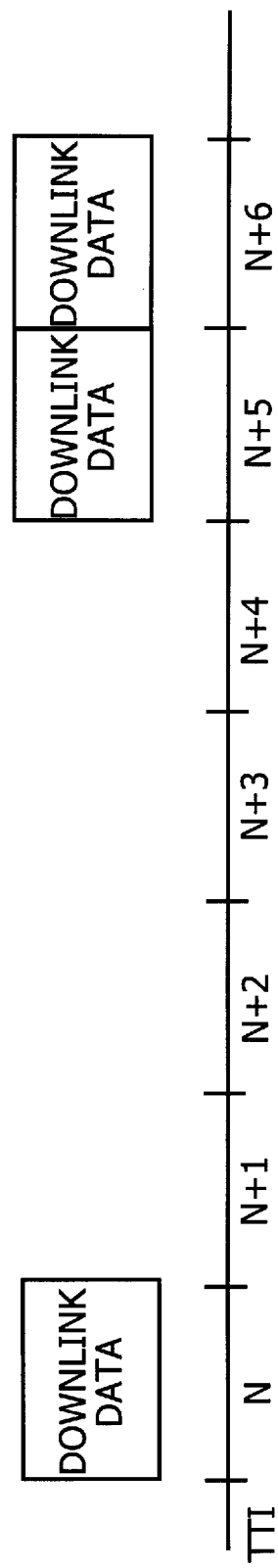
FIG. 7 illustrates an example of downlink data transmission timing.

Next, after the transmission and reception bandwidth setting required time has elapsed, the base station 100 transmits to the terminal 200 a downlink-direction control signal (DL transmission control signal) and transmission data (S20, S21). FIG. 7 illustrates an example of downlink data transmission timing. For example, the base station 100 transmits transmission data when TTI=N, and after the transmission and reception bandwidth setting required time has elapsed, transmits transmission data when TTI=N+5. A TTI is a Transmission Timing Interval, and is a unit indicating a transmission and reception interval. Here the explanation uses TTIs, but actual time (for example μsecs, msecs or similar) may be used. In the example of FIG. 7, the transmission bandwidth setting required time is TTI=5. For example, the scheduler 108 performs scheduling such that a control signal and transmission data after bandwidth modification are transmitted after the transmission and reception bandwidth setting required time has elapsed, and controls the encoding and modulation unit 112. On the other hand, the terminal 200 performs demodulation and various other reception processing of transmission data (S21) based on the control signal (S20).

In this way, in this radio communication system 10, the terminal 200 transmits in advance the transmission and reception bandwidth setting required time to the base station 100 (S15). Further, the terminal 200, after transmitting the transmission and reception bandwidth setting required time (S15), can perform bandwidth modification processing (for example, bandwidth modification from 100 MHz to 20 MHz, or from 20 MHz to 100 MHz) during the interval in which the base station 100 is performing scheduling.

Hence in the terminal 200, bandwidth modification processing ends before reception of transmission data and similar, so that compared with for example a case in which bandwidth modification processing is started after the reception of a DL transmission control signal, transmission data can be received and radio resources can be utilized effectively. Further, there is time during which the terminal 200 does not receive data and similar from the base station 100, and to this extent power consumption can also be reduced.

In this first example, as the transmission and reception bandwidth setting required time, for example this time may be held in the terminal 200 during the interval after transmission of this time (S15) until reception of the DL transmission control signal (S20). Further, in the base station 100, this time may be held during the interval after reception of the transmission and reception bandwidth setting required time (S15) until transmission of the DL transmission control signal (S20). The example of FIG. 4 is implemented by having the base station 100, while performing scheduling (S19), not perform transmission allocation to the terminal 200 or similar during the transmission and reception bandwidth setting required time. Further, during scheduling the terminal 200 performs reception bandwidth modification processing. For example, transmission of the transmission and reception bandwidth setting required time (S15) may be performed after transmitting radio channel quality information (S18) as well. However, bandwidth information after modification is not included in terminal information (S14), and so it is desirable that the transmission and reception bandwidth setting required time be transmitted immediately after (or simultaneously with) terminal information transmission.

Further, the base station 100 may for example transmit a control signal including a bandwidth modification request (S20). A bandwidth modification request addresses the bandwidth or similar after modification requested by a terminal 200 (S13, S14), and is transmitted by the base station 100, and may for example include the bandwidth after modification and the timing of completion of the reception bandwidth modification. The terminal 200, after receiving a bandwidth modification request (or control signal), performs modification processing so as to result in the bandwidth included in the request, and performs modification processing so as to be completed by the timing included in the request. After modification, the base station 100 transmits data and similar following bandwidth modification, and the terminal 200 receives the data and similar. In the example of FIG. 6, the terminal 200 performs bandwidth modification processing after the end of processing of transmission data (S21) for the DL control signal (S20). When the timing of modification completion is determined in advance, the bandwidth modification request may include only the bandwidth after modification. Further, the base station 100 may transmit not only a DL control signal, but a bandwidth modification request signal together with a DL control signal. Or, the base station 100 may transmit the bandwidth modification request signal independently. The timing of completion of bandwidth modification is explained in a third example.

Second Example

The first example was explained for the downlink direction. The second example is an example for the uplink direction. The respective configurations of the radio communication system 10, base station 100, and terminal 200 are similar to those in the first example (see for example FIG. 1 to FIG. 3). FIG. 8 is a sequence diagram illustrating an operation example.

The terminal 200, after transmitting the transmission and reception bandwidth setting required time (S15), transmits a pilot signal to the base station 100 (S31). For example, the pilot signal generation unit 208 generates a pilot signal, which is transmitted to the base station 100 via the encoding and modulation unit 211.

Next, the base station 100 measures and calculates the radio channel quality based on the pilot signal (S32). For example, the radio channel quality measurement and calculation unit 105 measures the radio channel quality and similar.

Next, the base station 100 performs uplink-direction scheduling based on the calculated radio channel quality (S33). At this time, for example similarly to the first example, the scheduler 108 does not perform transmission allocation to the terminal 200, or does not transmit control signals and similar, during the interval of the transmission and reception bandwidth setting required time. For example, the scheduler 108 controls the unit 103 and similar such that the transmission and reception bandwidth is not modified during the interval of the transmission and reception bandwidth setting required time, or a constant period which takes this time into consideration.

On the other hand, the terminal 200 stops reception processing during the interval of the transmission and reception bandwidth setting required time, and performs bandwidth modification processing. For example, the terminal setting control unit 207, after pilot signal transmission (S31), causes the encoding and modulation unit 211 and transmission radio unit 212 to perform bandwidth modification processing during the interval of the held transmission and reception bandwidth setting required time.

Next, after the transmission and reception bandwidth setting required time interval has elapsed, the base station 100 transmits a UL control signal to the terminal 200 based on scheduling (S34). Further, based on the control signal, the terminal 200 transmits transmission data with modified bandwidth to the base station 100 (S35). For example, the control signal generation unit 109 generates a UL control signal, and the terminal setting control unit 207 causes processing of the transmission data to be performed based on the control signal.

In this second example also, the transmission and reception bandwidth setting required time may for example be established in the terminal 200 over the interval after transmission of the time (S15) until reception of the UL transmission control signal (S34). In the base station 100, the time may be held over the interval from reception of the transmission and reception bandwidth setting required time (S15) until the DL transmission control signal is transmitted (S34).

In the second example also, the base station 100 may include a bandwidth modification request in the UL transmission control signal (S34). In this case, the terminal 200, after transmission of transmission data for the UL control signal (S35), performs bandwidth modification processing. The bandwidth modification request may include the bandwidth after modification and the timing of modification completion, or only the bandwidth after modification. Similarly to the first example, the base station 100 may transmit the bandwidth modification request signal together with the UL transmission control signal, or may transmit the bandwidth modification request signal independently.

Thus in the second example also, the terminal 200, after transmitting the transmission and reception bandwidth setting required time, stops transmission processing during the interval of this time, and can perform bandwidth modification processing, so that radio resources can be effectively utilized, and power consumption can also be reduced.

Third Example

Next, a third example is explained. The third example is an example in which the base station 100 provides notification of the timing of completion of bandwidth modification.

The examples of the configuration of the radio communication system 10, base station 100 and terminal 200 are similar to those of the first example (see FIG. 1 to FIG. 3).

FIG. 9 is an example of a sequence in the downlink direction. The base station 100, after scheduling (S19), transmits a DL transmission control signal, and transmits transmission data (S41, S42). For example, the base station 100 transmits a DL transmission control signal as a bandwidth modification request for the terminal 200. Or, the base station 100 may transmit a control signal indicating a bandwidth modification request for the terminal 200 together with a DL transmission control signal. The bandwidth modification request may include the bandwidth after modification, similarly to the first example. For example, the scheduler 108 generates a bandwidth modification request based on terminal information and similar, and outputs the request to the control signal generation unit 109.

Next, the base station 100 notifies the terminal 200 of the reception bandwidth modification completion timing (S43). For example, the scheduler 108 generates a reception bandwidth modification completion timing based on the transmission and reception bandwidth setting required time, and outputs the timing to the control signal generation unit 109.

The control signal generation unit 109 transmits to the terminal 200 the reception bandwidth modification completion timing via the encoding and modulation unit 112 or similar, for example. The reception bandwidth modification completion timing may for example contain a bandwidth modification request for terminals 200 of the base station 100. Or, the base station 100 and terminals 200 may handle reception bandwidth modification completion timing as bandwidth change requests.

FIG. 10A and FIG. 10B illustrate examples of reception bandwidth modification completion timing. For example, when TTI=N the base station 100 issues notification of the reception bandwidth modification completion timing as TTI=5. In this case, the base station 100 transmits downlink transmission data when TTI=N+5. The reception bandwidth modification completion timing may be transmitted in the same frame as downlink transmission data (see FIG. 10A), or only a downlink control signal may be transmitted (see FIG. 10B). In the example of FIG. 10A and similar, the terminal 200 completes reception bandwidth modification processing by TTI=N+5.

Next, the base station 100 transmits a DL transmission control signal (S44) after the reception bandwidth modification completion timing has elapsed (or at the timing of reception bandwidth modification completion), and transmits transmission data after bandwidth modification (S45). For example, the scheduler 108 holds the transmitted reception bandwidth modification completion timing, and after the timing has elapsed or similar, performs scheduling for the terminal 200 and transmits a control signal.

On the other hand, the terminal 200, for example after receiving reception bandwidth modification completion timing notification (S43), performs bandwidth modification processing, and completes bandwidth modification processing by this timing. Thereafter the terminal 200 receives transmission data (S45).

FIG. 11 illustrates an example of an uplink-direction sequence. After scheduling (S33), the base station 100 transmits a UL transmission control signal (S51), and notifies the terminal 200 of the transmission bandwidth modification completion notification timing (S52). For example, similarly to the downlink direction, the control signal generation unit 109 generates a control signal including this timing.

Figure 12A:
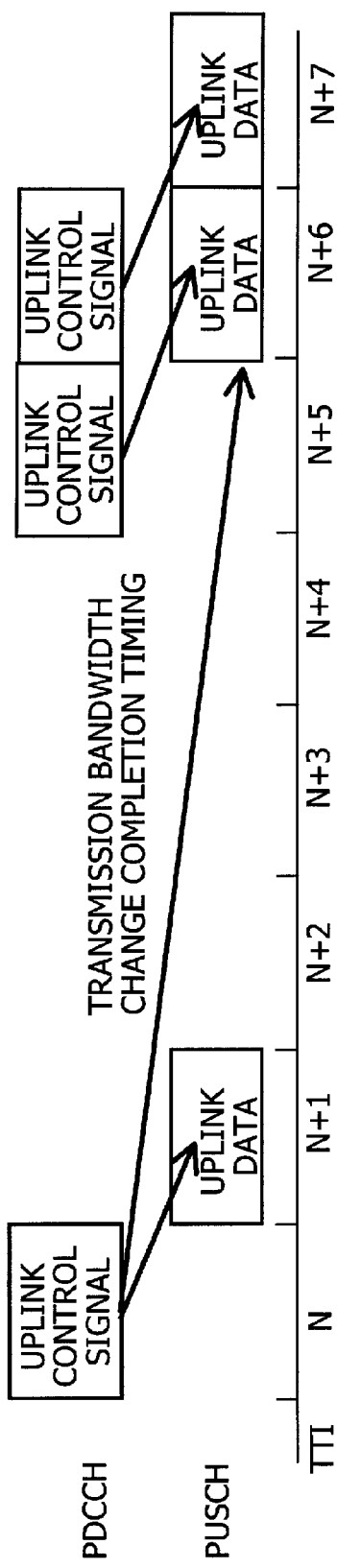
FIG. 12A and FIG. 12B illustrate examples of transmission bandwidth change completion timing.
Figure 12B:
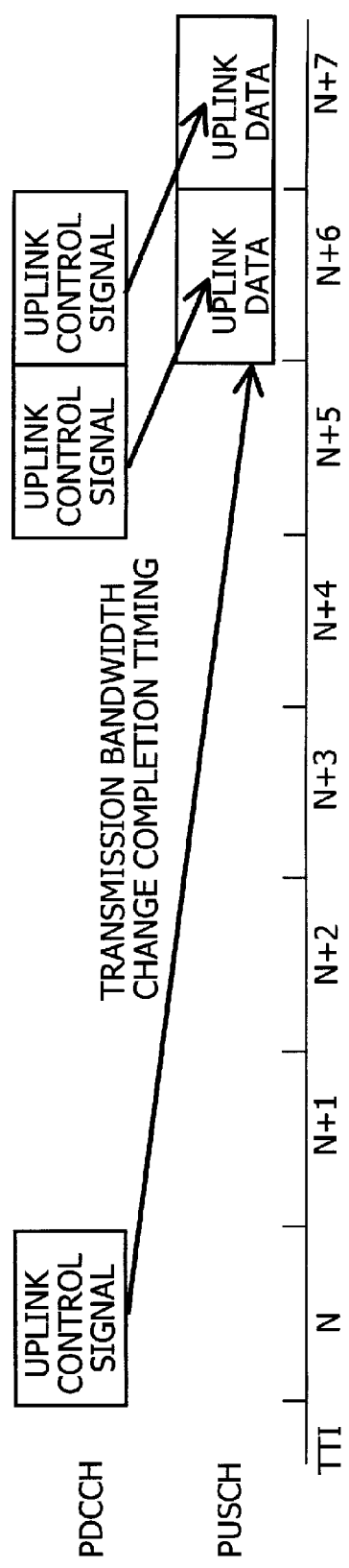

FIG. 12A and FIG. 12B illustrate examples of transmission bandwidth modification completion notification timing. For example the base station 100 transmits TTI=6 as the transmission bandwidth modification completion notification timing, and the terminal 200 receives uplink data when TTI=N+6. The terminal 200 completes bandwidth modification processing by TTI=N+6.

Next, the terminal 200 transmits transmission data to the base station 100 (S53). The transmission data corresponds for example to transmission data transmitted with timing TTI=N+1 in FIG. 12A.

Next, after the transmission bandwidth modification completion notification timing has elapsed, the base station 100 transmits a UL transmission control signal (S54), and after bandwidth modification, transmits transmission data (S55).

In the case of the uplink direction, similarly to the downlink direction, for example the base station 100 transmits an UL transmission control signal including a bandwidth modification request (S51). The base station 100 may transmit a control signal indicating a bandwidth modification request together with an UL transmission control signal.

The bandwidth modification request includes for example the bandwidth after modification.

In this third example, after reception of transmission data (S53), the base station 100 does not transmit a control signal or similar until the transmission and reception bandwidth setting required time has elapsed (or until the timing of the transmission and reception bandwidth modification completion notification timing has elapsed) (S44, S54), so that radio resources can be utilized effectively. Further, during bandwidth modification processing, the terminal 200 does not receive control signals or similar from the base station 100, so that power consumption can be reduced.

Fourth Example

Next, a fourth example is explained. The fourth example is an example relating to the category of the terminal 200.

FIG. 13A and FIG. 13B illustrate examples of the configuration of tables including categories. A category is for example information relating to terminal capability of a terminal 200, and is also information used for radio communication between a base station 100 and a terminal 200. A category includes for example the maximum number of HS-DSCHs (High-Speed Downlink Shared Channels) which can be received at one time, the minimum inter-TTI interval for intermittent reception, the maximum number of bits in a HS-DSCH transmission block, the total number of bits in a soft channel, and similar.

This fourth example is an example in which the time accompanying bandwidth modification (or the change time) in a terminal 200 is added to the category. In the example of FIG. 13A, "Category 1" indicates that, when the bandwidth after modification for the reception side Rx is "10M" Hz and the bandwidth after modification on the transmission side Tx is "5M" Hz, the change time is "$T_1$". And as illustrated in FIG. 13B, even when the reception side Rx is "10M" Hz and the transmission side Tx is "10M" Hz, there may be cases in which, for the different category numbers "Category 2" to "Category 4", there are different change times "$T_{10}$" to "$T_{12}$". This takes into consideration the characteristics and similar of the terminal 200.

When categories are used, the terminal 200 may directly provide notification of the transmission and reception bandwidth setting required time as in the first example and similar (S15 in FIG. 4 and similar), or may provide notification of the category number. For example, the base station 100 and terminal 200 hold a table related to categories (for example FIG. 13A), and the bandwidth after modification can be obtained based on the category number.

Figure 14:
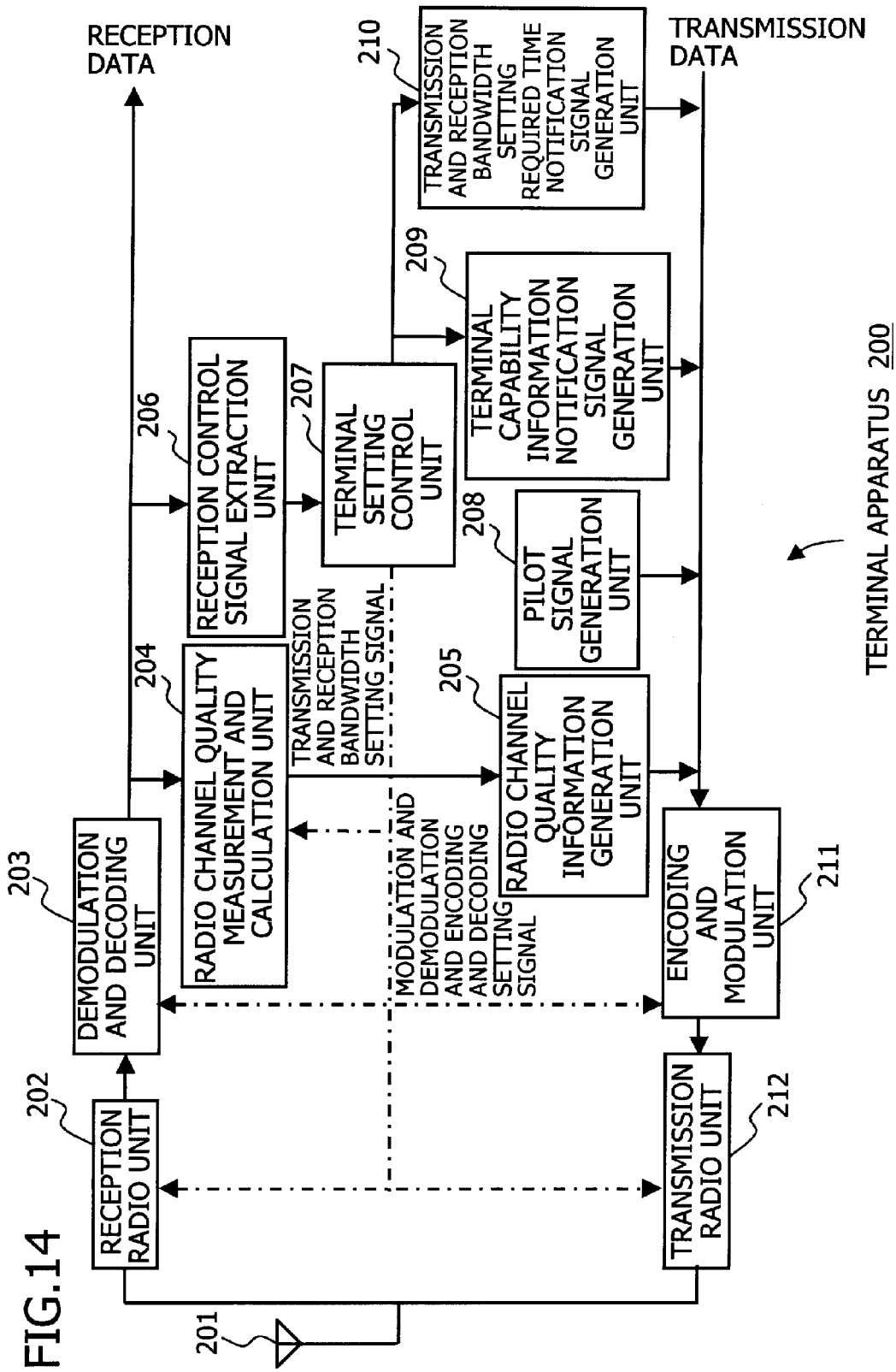
FIG. 14 illustrates an example of the configuration of a terminal apparatus.

FIG. 14 illustrates an example of the configuration of a terminal apparatus 200 in the fourth example. The terminal setting control unit 207 holds for example a table relating to categories, and based on the bandwidth after modification in the terminal 200, reads out the change time or category number from the table. The terminal setting control unit 207 outputs the change time or category number to the required time notification signal generation unit 210 or to the terminal capability information notification signal generation unit 209, respectively.

Examples of the configurations of the radio communication system 10 and base station 100 are similar to those in the first example and similar (for example, FIG. 1 and FIG. 2).

An example of operation when a terminal 200 transmits a change time is illustrated, similarly to the first example, in FIG. 4, FIG. 8, FIG. 9 and FIG. 11. For example, the terminal 200, by transmitting a change time to the base station 100 as a transmission and reception bandwidth setting required time (S15), can execute operation similarly to the first example.

An example of operation when a terminal 200 transmits a category number is illustrated in FIG. 14 to FIG. 18. As illustrated in FIG. 14, the terminal 200 transmits terminal information including a category number (S141).

Figure 15:
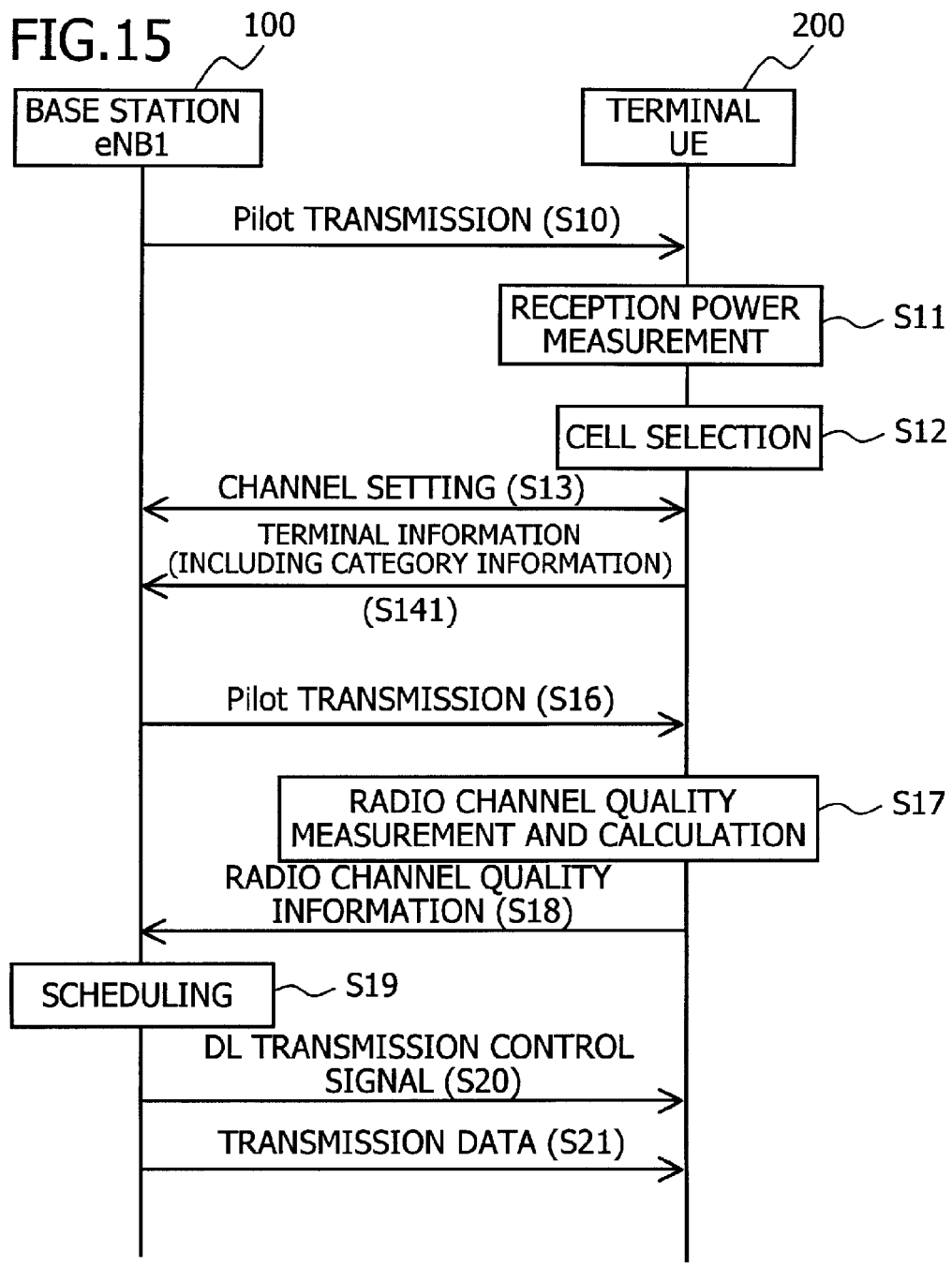
FIG. 15 is a sequence diagram illustrating an operation example.
Figure 16:
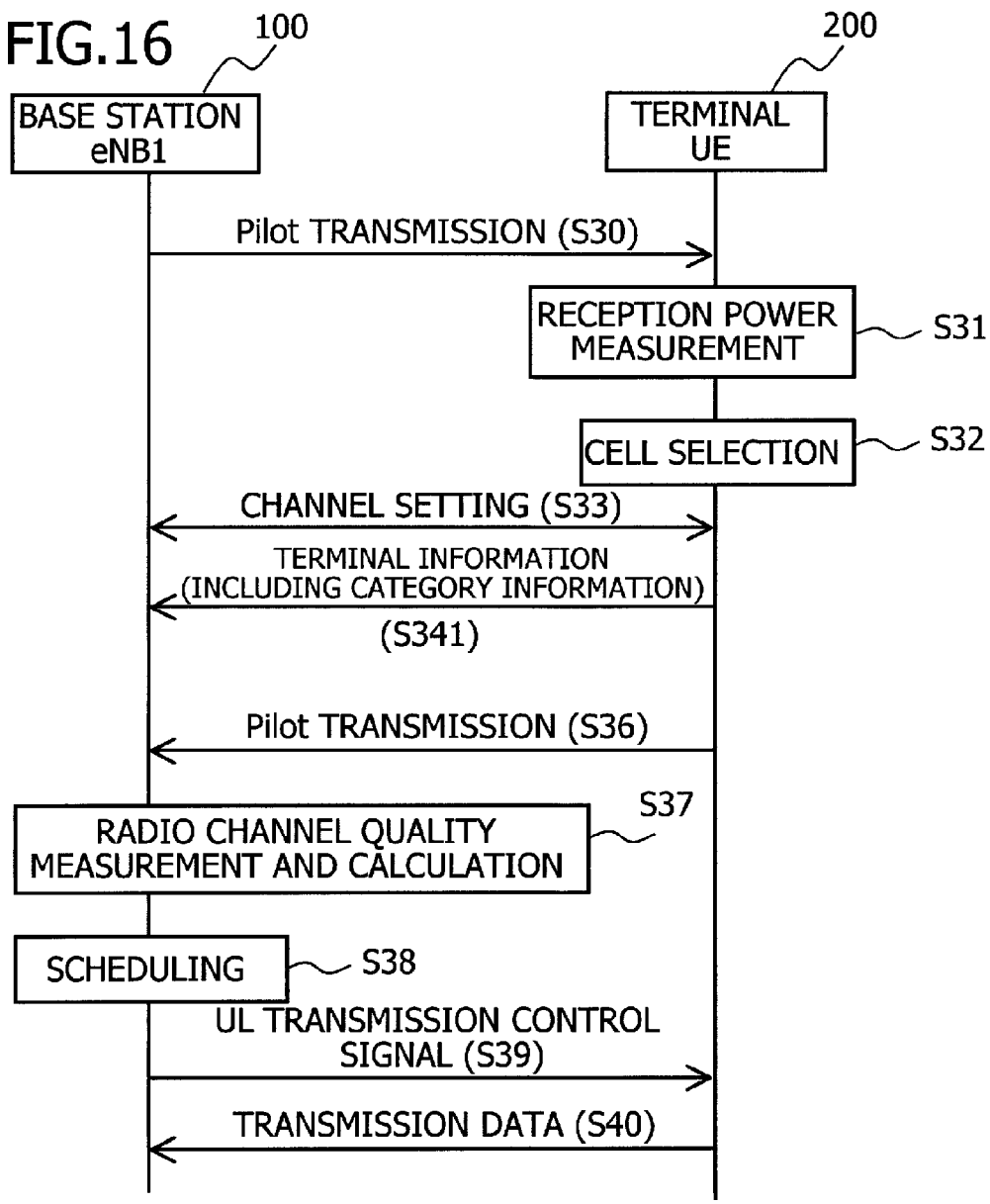
FIG. 16 is a sequence diagram illustrating an operation example.
Figure 17:
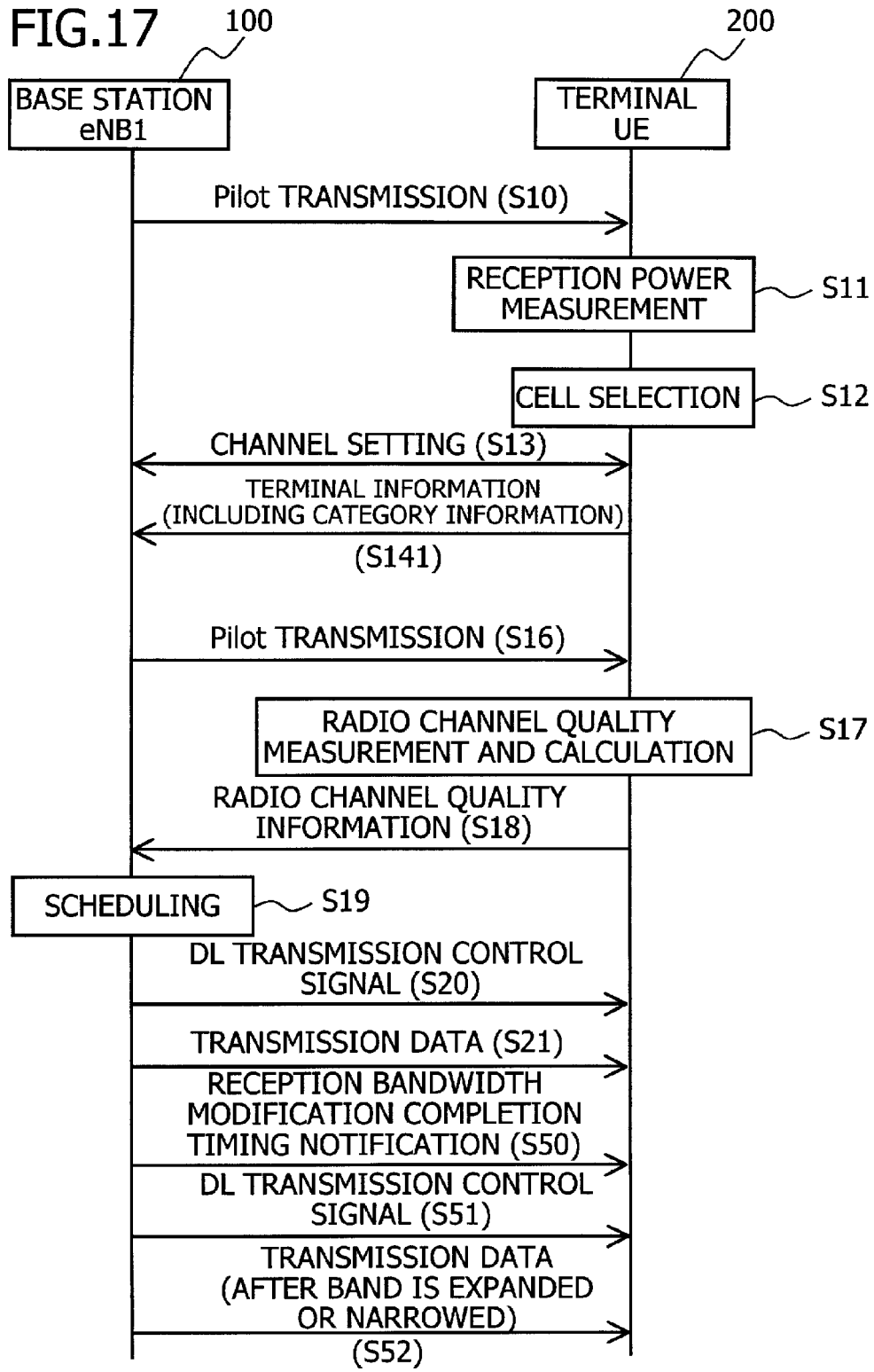
FIG. 17 is a sequence diagram illustrating an operation example.
Figure 18:
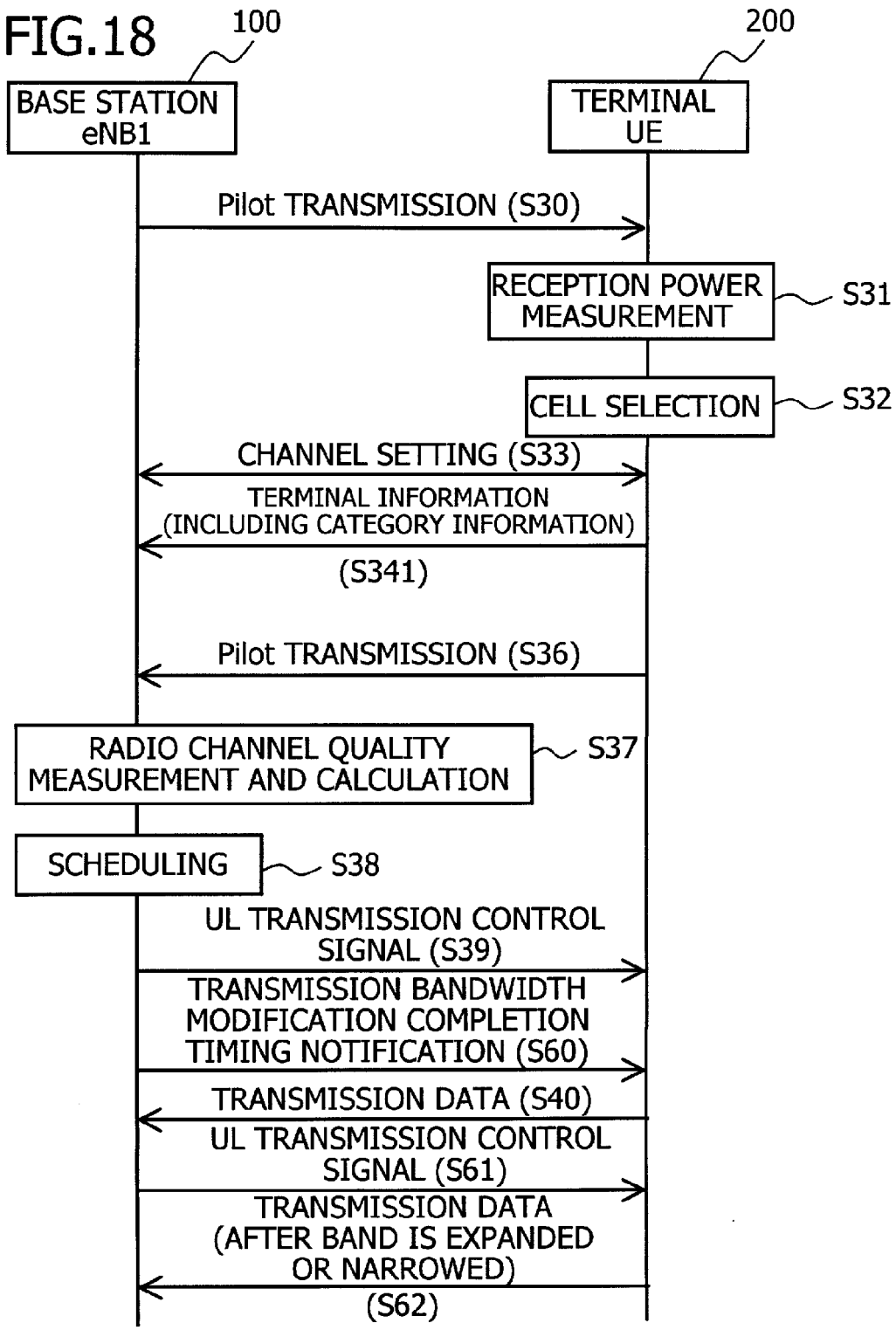
FIG. 18 is a sequence diagram illustrating an operation example.

In case of uplink, the terminal 200 transmits to the base station 100 terminal information including category information as illustrated in FIG. 15.

Further, in a case where the transmission and reception bandwidth modification completion timing is notified from the base station 100 (S50, and S60 in FIG. 18), the terminal 200 transmits terminal information including a category number (S141, S341).

In all cases, the base station 100 reads out the change time from the received category number and a table, and does not performing scheduling or similar for the terminal 200 during the change time. By this means, operation can be executed similarly to the first example.

When the terminal 200 transmits a category number or similar, the category number or similar is read out from a table. When for example the reception side Rx is "20M" Hz, there may be a plurality of cases in which the category is "Category 3" to "Category 6" and the change time is "$T_1$" to "$T_3$". In such cases, the terminal 200 may select the longest change time "$T_3$" (or Category 6, corresponding to this) and notify the base station 100.

Or, the terminal 200 may select all the change times or category numbers which are candidates and notify the base station 100. For example, the terminal 200 may provide notification of the change times "$T_1$" to "$T_3$" (or "Category 3" to "Category 6").

Or, the terminal 200 may acquire information relating to the bandwidth after modification from the base station 100 (for example, acquiring a control signal transmitted from the base station 100), and may select the corresponding change time and similar from the bandwidth after modification of the terminal itself. In this case, the terminal setting control unit 207 extracts the bandwidth of the base station 100 after modification from the control signal, reads out from a table the change time or category number corresponding to the bandwidth held after modification in the terminal 200, and outputs the result to the units 209 and 210.

When the terminal 200 transmits the maximum value of the change time or all change time candidates for selection, the bandwidth after modification is not obtained from the base station 100, and thus for example if a table is held in the required time notification signal generation unit 210, the terminal 200 can execute the operation of the example of FIG. 3.

Thus in this fourth example also, for example the base station 100 does not transmit transmission data or similar until the change time or the transmission and reception bandwidth setting required time has elapsed, so that radio resources can be utilized effectively. Further, the terminal 200 performs bandwidth modification processing during this time, and thereafter receives data and similar. Hence the terminal 200 does not perform processing for reception or transmission of data or similar during the bandwidth modification processing, so that power consumption can be reduced.

Fifth Example

Next a fifth example is explained. The fifth example is an example in which, after a terminal 200 expands the bandwidth and transmits or receives data or similar, when data transmission is not performed for a constant period, the bandwidth is reduced.

Figure 19:
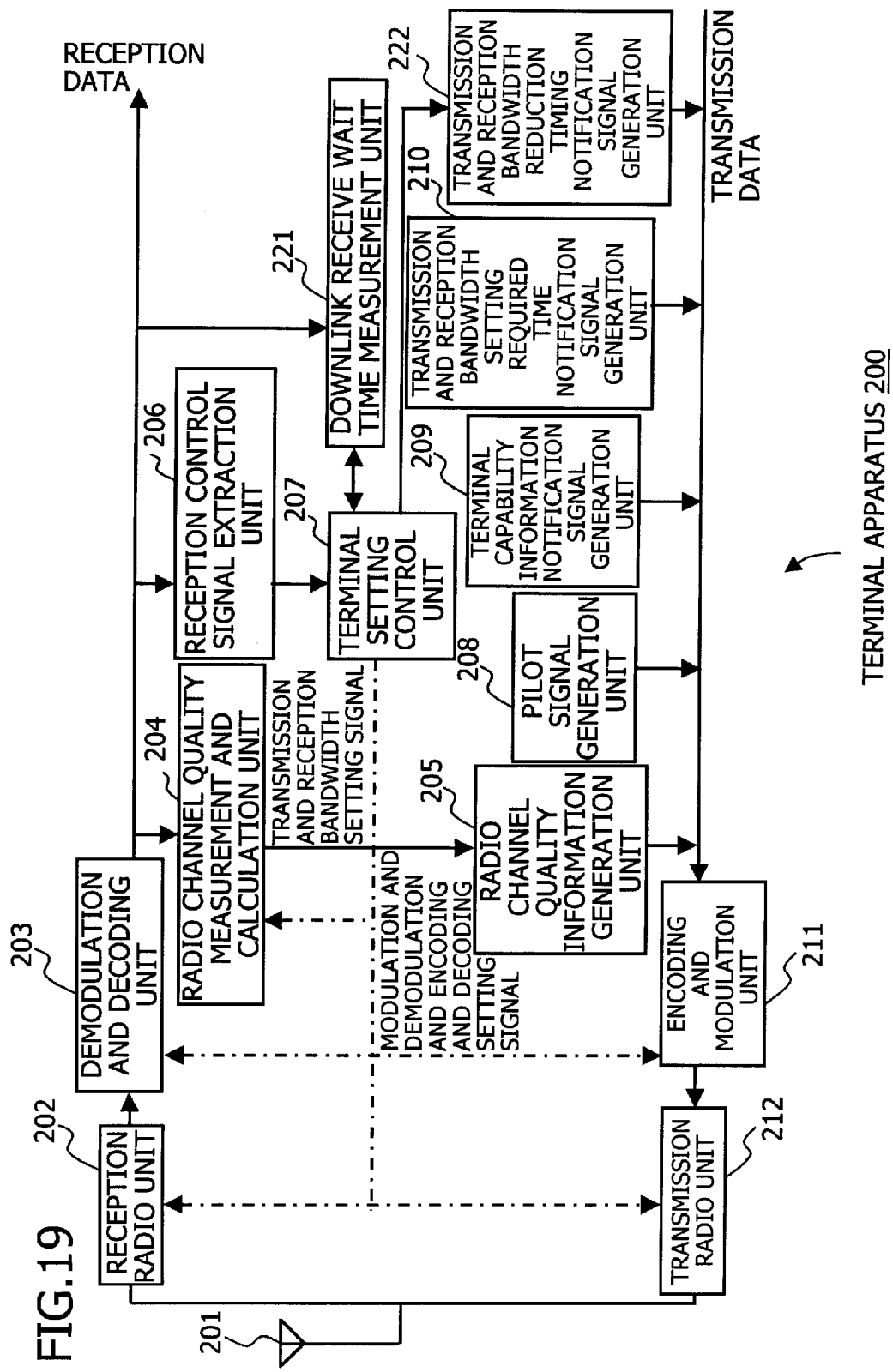
FIG. 19 illustrates an example of the configuration of a terminal apparatus.

First, an example for the downlink direction is explained. FIG. 19 illustrates an example of the configuration of a terminal apparatus 200. The terminal apparatus 200 further includes a downlink receive wait time measurement unit 221 and a transmission and reception bandwidth reduction timing notification signal generation unit 222.

The downlink receive wait time measurement unit 221 measures the time T1 elapsed after downlink data is received, and for example outputs the elapsed time T1 to the terminal setting control unit 207.

The transmission and reception bandwidth reduction timing notification signal generation unit 222, upon notification of the reception bandwidth reduction timing from the terminal setting control unit 207, generates a reception bandwidth reduction timing notification signal (hereafter "timing notification signal") indicating this timing, and outputs the signal to the encoding and modulation unit 211.

When for example the terminal setting control unit 207 takes as input the elapsed time T1 from the downlink receive wait time measurement unit 221, the terminal setting control unit 207 judges whether this time T1 exceeds a threshold value T1$th$, and if the threshold value is exceeded, outputs the reception bandwidth reduction timing to the transmission and reception bandwidth reduction timing notification signal generation unit 222. The threshold judgment may for example be performed by the downlink receive wait time measurement unit 221. In this case, the downlink receive wait time measurement unit 221 outputs a signal indicating that the threshold value is exceeded to the terminal setting control unit 207, and the terminal setting control unit 207 outputs the reception bandwidth reduction timing based on this signal. For example, when the elapsed time T1 does not exceed the threshold value T1$th$, the downlink receive wait time measurement unit 221 and the terminal setting control unit 207 do not perform bandwidth modification processing.

The reception bandwidth reduction timing is for example the timing for the terminal 200 to start reduction of the reception bandwidth. For example, the terminal setting control unit 207 controls the reception radio unit 202 and demodulation and decoding unit 203 so as to reduce the reception bandwidth with this timing. The reception bandwidth after modification is for example the bandwidth with which reception of a synchronous channel for reception to maintain synchronization with the base station 100 (for example, SCH or similar) can be performed without problem. For example, the terminal setting control unit 207 or transmission and reception bandwidth reduction timing notification signal generation unit 222 may generate a timing notification signal so as to further include the bandwidth after reduction.

Figure 20:
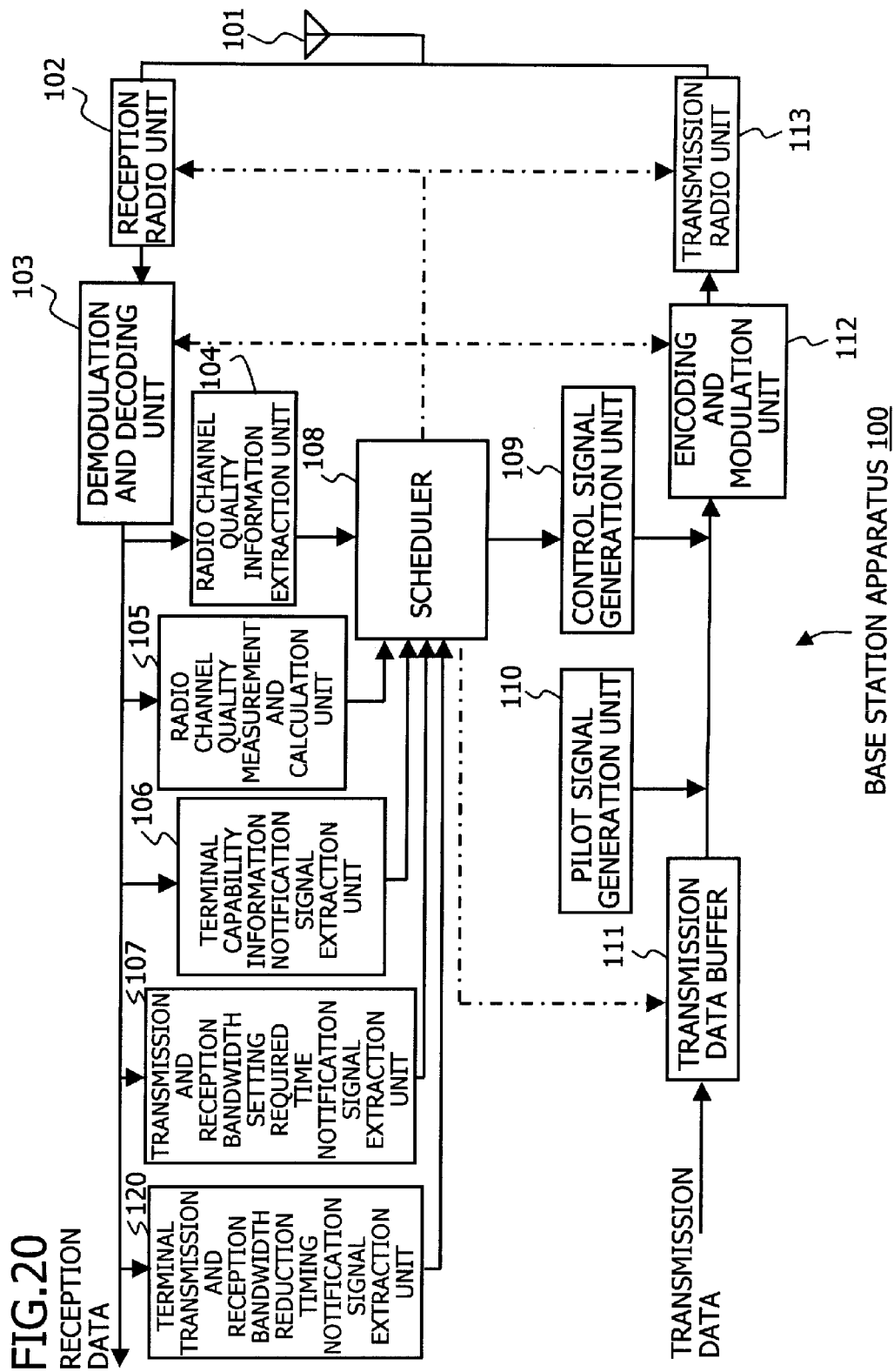
FIG. 20 illustrates an example of the configuration of a base station apparatus.

FIG. 20 illustrates an example of the configuration of a base station apparatus 100. The base station apparatus 100 further includes a terminal transmission and reception bandwidth reduction timing notification signal extraction unit (hereafter "timing notification signal extraction unit") 120.

The timing notification signal extraction unit 120 extracts a timing notification signal transmitted from the terminal apparatus 200, and outputs the signal to the scheduler 108.

For example, the scheduler 108, upon input of the timing notification signal, reduces the bandwidth with this timing, and performs scheduling for the terminal apparatus 200 using the reduced bandwidth.

Figure 21:
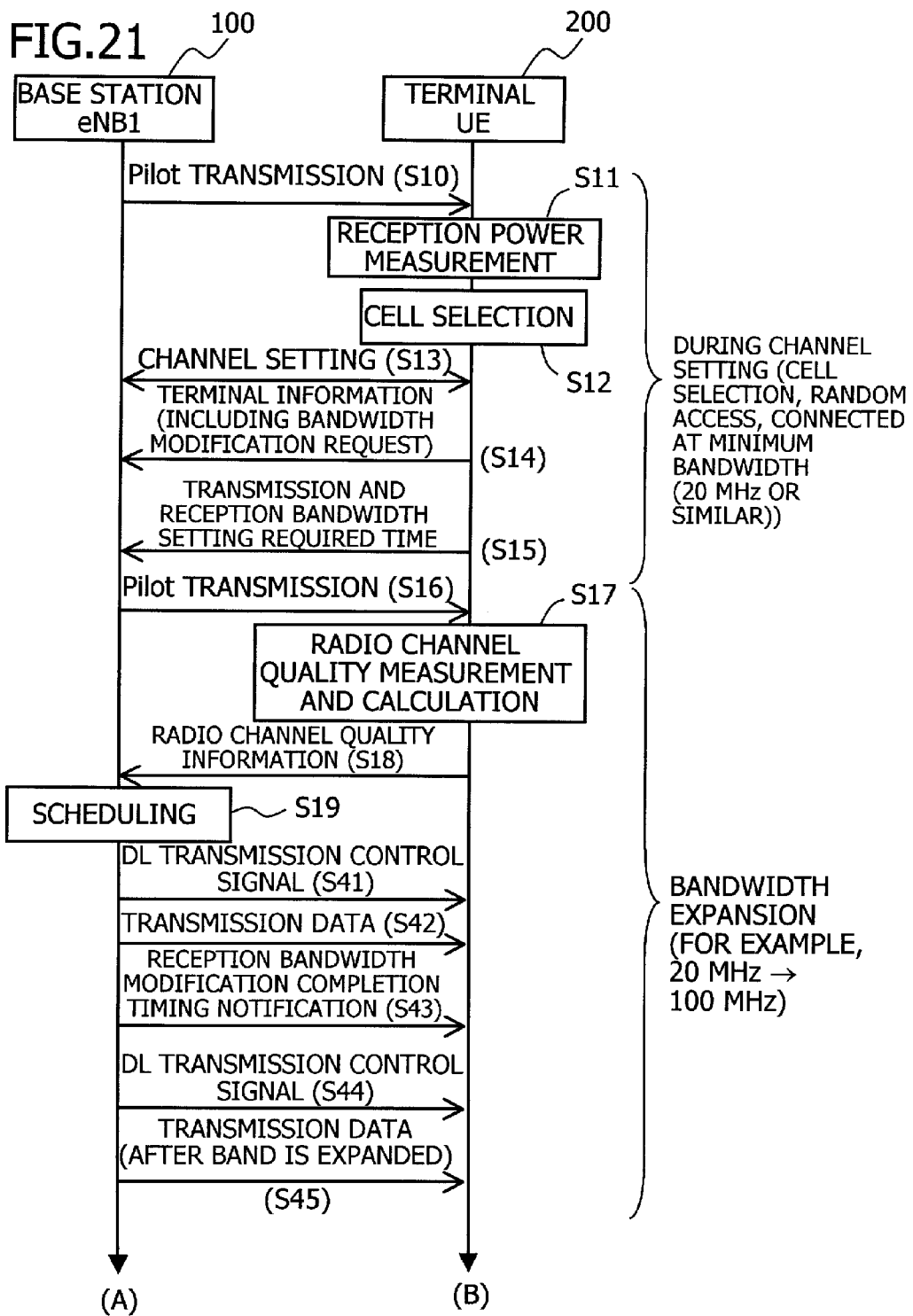
FIG. 21 is a sequence diagram illustrating an operation example.
Figure 22:
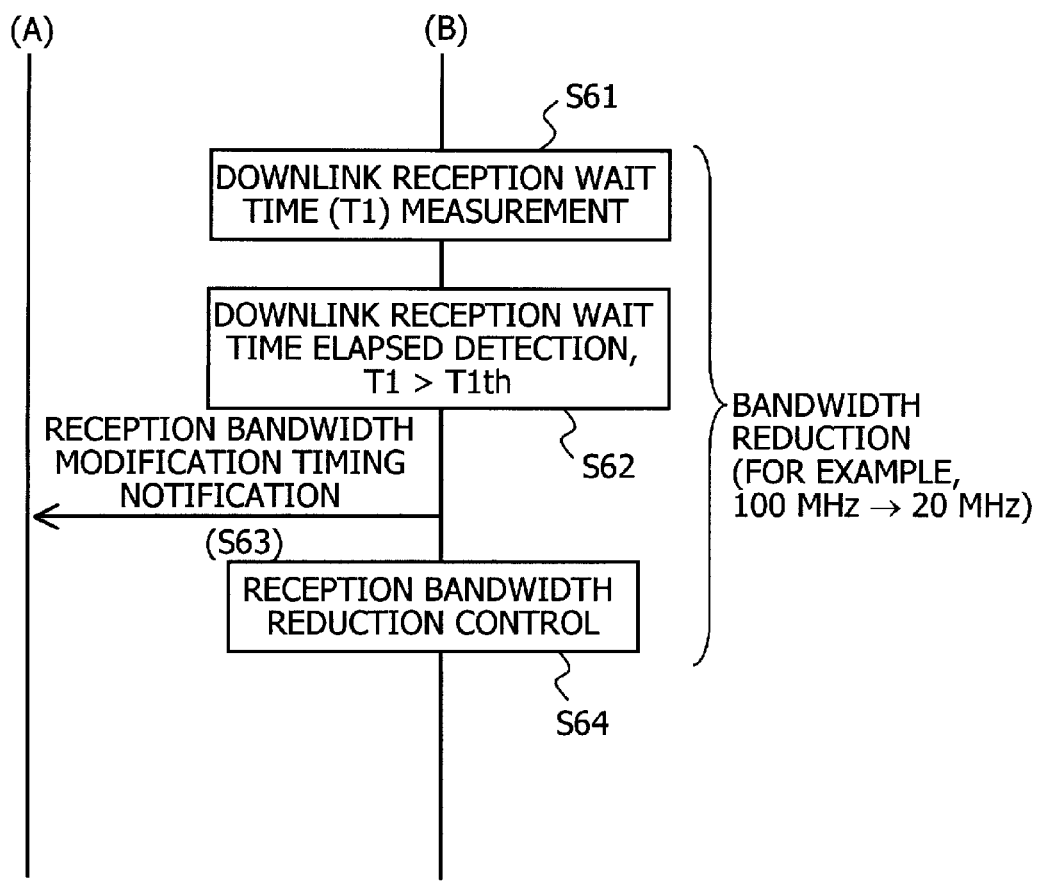
FIG. 22 is a sequence diagram illustrating an operation example.

Next, operation is explained. FIG. 21 and FIG. 22 are sequence diagrams illustrating a downlink-direction operation example.

The base station 100 and terminal 200 perform the processing S10 to S15, and set the channel. Similarly to the first example and similar, the terminal 200 notifies the base station 100 of the transmission and reception bandwidth setting required time (S15).

The base station 100 and terminal 200 perform the processing of S16 to S45, and expand the bandwidth beyond the channel setting. The base station 100 transmits data using the expanded bandwidth (S45).

Next, the terminal 200 measures the downlink wait time T1 (S61). For example, the downlink receive wait time measurement unit 221 measures the elapsed time T1.

Next, the terminal 200 judges whether the elapsed time T1 exceeds a threshold value T1$th$ (S62). For example, a judgment is made by the downlink receive wait time measurement unit 221 or by the terminal setting control unit 207.

When the elapsed time T1 exceeds the threshold value, the terminal 200 provides notification of reception bandwidth modification timing (S63). For example, the transmission and reception bandwidth reduction timing notification signal generation unit 222 generates a timing signal, which is transmitted via the encoding and modulation unit 211 and similar. For example, the timing notification signal extraction unit 120 of the base station 100 extracts the timing signal.

Next, the terminal 200 executes control to reduce the bandwidth (S64). For example, the scheduler 108 of the base station 100 performs scheduling of the terminal 200 such that data and similar is not transmitted during the interval of the set required time (S15) from the timing included in the timing signal. The scheduler 108 performs scheduling such that after the set required time has elapsed, data and similar is transmitted to the terminal 200 using the reduced bandwidth.

In operation in the downlink direction, the terminal 200 may transmit terminal information including a bandwidth modification request which requests bandwidth expansion (S14). In this case, the base station 100 transmits a DL transmission control signal including information relating to the bandwidth after expansion (for example 100 MHz) (S41). Further, the base station 100 transmits the timing for bandwidth modification (S43). The terminal 200 may transmit the bandwidth modification request separately from the terminal information.

Further, the terminal 200 may execute transmission including the maximum transmission bandwidth similarly to the transmission in the first example. Further, the terminal 200 may transmit transmission bandwidth modification timing notification (S63) including a bandwidth modification request which requests contraction of bandwidth, and the timing notification itself may be a bandwidth modification request which requests bandwidth contraction.

Figure 23:
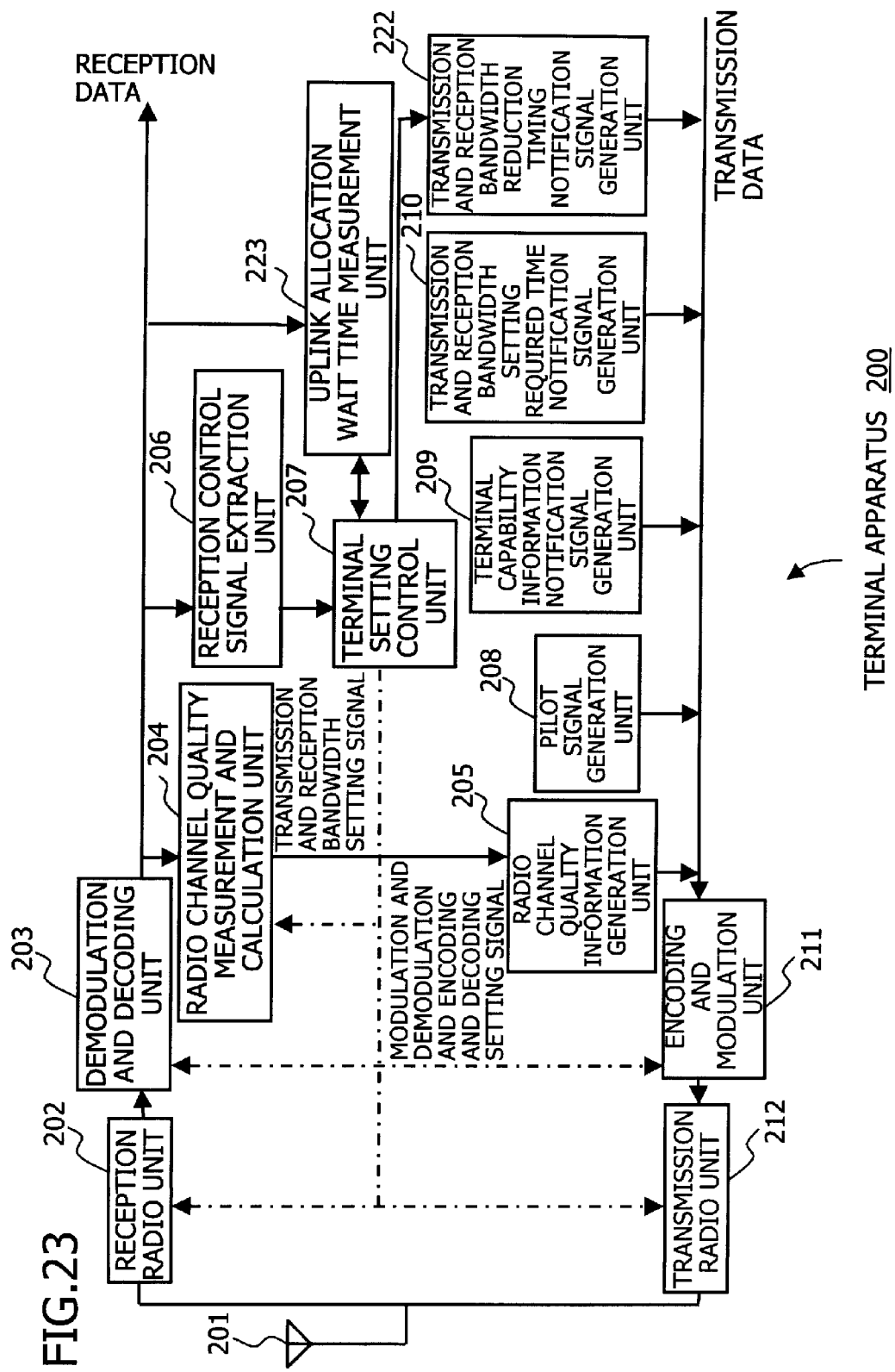
FIG. 23 illustrates an example of the configuration of a terminal apparatus.

Next an example for the uplink direction is explained. FIG. 23 illustrates an example of the configuration of a terminal apparatus 200. The terminal apparatus 200 further includes an uplink allocation wait time measurement unit 223.

The uplink allocation wait time measurement unit 223 measures the time T2 elapsed from transmission allocation of uplink-direction data and similar, and outputs the elapsed time T2 to the terminal setting control unit 207. For example, the uplink allocation wait time measurement unit 223 may compare the elapsed time T2 with a threshold value T2$th$, and when the elapsed time T2 exceeds the threshold value T2$th$, may output to the terminal setting control unit 207 a signal indicating that the threshold value is exceeded.

The transmission and reception bandwidth reduction timing notification signal generation unit 222 generates a transmission bandwidth reduction timing notification signal by means of control by the terminal setting control unit 207 or similar.

An example of the configuration of the base station 100 is similar to that for the downlink direction, and is for example illustrated in FIG. 20.

Next an operation example is explained. FIG. 24 and FIG. 25 are sequence diagrams illustrating an uplink-direction operation example.

The base station 100 and terminal 200 perform the processing of S10 to S15, and set the channel.

The base station 100 and terminal 200 perform the processing of S31 to S55, expand the bandwidth beyond that of the channel settings, and transmit data and similar using the expanded bandwidth.

Next, the terminal 200 measures the uplink transmission allocation wait time T2 (S71). For example, the uplink allocation wait time measurement unit 223 measures the elapsed time from reception of a control signal relating to uplink-direction transmission allocation.

Next, the terminal 200 judges whether the measured elapsed time T2 exceeds the threshold value T2$th$ (S72). For example, the terminal setting control unit 207 or similar performs judgment.

Next, the terminal 200 issues transmission bandwidth modification timing when the elapsed time T2 exceeds the threshold value T2$th$ (S73). For example, the transmission and reception bandwidth reduction timing notification signal generation unit 222 generates a transmission bandwidth reduction timing notification signal, and transmits the signal via the encoding and modulation unit 211 or similar. For example, the transmission bandwidth reduction timing indicates the timing with which the terminal 200 reduces the transmission data bandwidth, and the bandwidth after reduction is the bandwidth at which a synchronous channel can be received.

The terminal 200 then executes control to reduce the transmission bandwidth (S74). For example, the terminal setting control unit 207 executes control of the encoding and modulation unit 211 and transmission radio unit 212 and similar such that data can be transmitted using the reduced bandwidth.

In the uplink direction also, the terminal 200 may include a bandwidth modification request which requests bandwidth expansion in terminal information and transmit the terminal information (S14). In this case, the base station 100 may include information relating to the bandwidth after expansion (for example 100 MHz) in a UL transmission control signal which is transmitted (S51). Further, the base station 100 transmits the bandwidth modification timing (S52). The terminal 200 may transmit a bandwidth modification request separately from terminal information. Further, the terminal 200 may, similarly to the first example, include a maximum transmission bandwidth and similar in a bandwidth modification request which is transmitted. Also, the terminal 200 may include a bandwidth modification request which requests bandwidth contraction in a reception bandwidth modification timing notification (S73) which is transmitted, and the timing notification may itself be a bandwidth modification request which requests bandwidth contraction.

Thus in this fifth example, after bandwidth expansion, when the terminal 200 does not transmit or receive data or similar for a constant period, the bandwidth is reduced.

Hence the terminal 200 does not receive data and similar using unnecessary bandwidth, so that power consumption can be reduced. Further, the call duration of the terminal 200 can also be extended. This fifth example includes portions which can be executed similarly to the first example, and so radio resources can be effectively utilized.

Other Examples

In the first example, the terminal 200 transmitted terminal information requesting bandwidth modification and a transmission and reception bandwidth setting required time to the base station (S14, S15). When for example the transmission and reception bandwidth setting required time is determined in advance, the terminal 200 need not transmit the transmission and reception bandwidth setting required time, and may transmit only terminal information. The base station 100, having received terminal information including information relating to the bandwidth after modification, does not transmit data or similar to the terminal 200 for the predetermined time, and the terminal 200 can perform bandwidth modification processing during this time.

EXPLANATION OF SYMBOLS

10 Radio communication system
100 Base station apparatus (base station)
102 Reception radio unit
103 Demodulation and decoding unit
104 Radio channel quality information extraction unit
105 Radio channel quality measurement and calculation unit
106 Terminal capability information notification signal extraction unit
107 Transmission and reception bandwidth setting required time notification signal extraction unit (required time notification signal generation unit)
108 Scheduler
109 Control signal generation unit
112 Encoding and modulation unit
113 Transmission radio unit
120 Terminal transmission and reception bandwidth reduction timing notification signal extraction unit (timing notification signal extraction unit)
200 Terminal apparatus (terminal)
202 Reception radio unit
203 Demodulation and decoding unit
204 Radio channel quality measurement and calculation unit
205 Radio channel quality information generation unit
206 Reception control signal extraction unit
207 Terminal setting control unit
209 Terminal capability information notification signal generation unit
210 Transmission and reception bandwidth setting required time notification signal generation unit (required time notification signal generation unit)
211 Encoding and modulation unit
212 Transmission radio unit
221 Downlink receive wait time measurement unit
222 Transmission and reception bandwidth reduction timing notification signal generation unit
223 Uplink allocation wait time measurement unit

The invention claimed is:

1. A radio communication system, comprising:
a base station apparatus; and
a terminal apparatus, wherein
radio communication is performed between the base station apparatus and terminal apparatus,
the terminal apparatus includes:
a required time notification signal generation unit configured to generate a required time notification signal indicating a required time to allow the terminal apparatus to process a change of a radio transmission bandwidth or a radio reception bandwidth; and
a transmission unit configured to transmit the required time notification signal to the base station apparatus,
the base station apparatus includes a reception unit configured to receive the required time notification signal, and
the required time is a time after the transmission unit is configured to transmit the required time notification signal until the terminal apparatus is configured to receive a control signal transmitted from the base station apparatus.

2. The radio communication system according to claim 1, wherein the base station apparatus further includes a transmission unit configured to transmit to the terminal apparatus a bandwidth change request requesting change of radio bandwidth for the terminal apparatus, after receiving the required time notification signal.

3. The radio communication system according to claim 2, wherein
the transmission unit of the base station apparatus is configured to transmit to the terminal apparatus the bandwidth change request and an uplink control signal, and
the terminal apparatus is configured to change the radio transmission bandwidth in accordance with the bandwidth change request.

4. The radio communication system according to claim 2, wherein
the transmission unit of the base station apparatus is configured to transmit to the terminal apparatus the bandwidth change request and a downlink control signal, and
the terminal apparatus is configured to modify the radio reception bandwidth in accordance with the bandwidth change request.

5. The radio communication system according to claim 2, wherein
the transmission unit of the base station apparatus is configured to transmit to the terminal apparatus the bandwidth change request and a completion timing of bandwidth change, and
the terminal apparatus is configured to change the radio transmission bandwidth or the radio reception bandwidth according to the completion timing of bandwidth change.

6. The radio communication system according to claim 2, wherein the bandwidth change request includes information relating to a changed bandwidth for the terminal apparatus.

7. The radio communication system according to claim 2, wherein the bandwidth change request includes the changed bandwidth and a completion timing of bandwidth change.

8. The radio communication system according to claim 1, wherein the base station apparatus further includes a scheduler configured to stop transmission or reception allocation for the terminal apparatus during the required time.

9. The radio communication system according to claim 1, wherein the base station apparatus further includes a scheduler configured not to change the radio transmission bandwidth or the radio reception bandwidth for the terminal apparatus during the required time.

10. The radio communication system according to claim 1, wherein the terminal apparatus further includes a terminal setting control unit configured to specify a terminal category relating to terminal capability of the terminal apparatus based on the required time.

11. The radio communication system according to claim 1, wherein the terminal apparatus further includes a terminal setting control unit configured to control such that transmission operation or reception operation to or from the base station apparatus is stopped during the required time.

12. The radio communication system according to claim 11, wherein the setting control unit is configured to perform transmission operation or reception operation to or from the base station apparatus after the required time has elapsed.

13. The radio communication system according to claim 1, wherein the base station apparatus further includes a transmission unit configured to transmit a control signal to perform transmission operation or reception operation to or from the terminal apparatus, after the required time has elapsed.

14. The radio communication system according to claim 1, wherein
the transmission unit is configured to transmit to the base station apparatus, in place of the required time, a terminal category specified by a terminal setting control, and
the base station apparatus is configured to stop transmission operation or reception operation to or from the terminal apparatus during the required time specified based on the terminal category.

15. A terminal apparatus for performing radio communication with a base station apparatus, the terminal apparatus comprising:
a required time notification signal generation unit configured to generate a required time notification signal indicating a required time to allow the terminal apparatus to process a change of a radio transmission bandwidth or a radio reception bandwidth to the base station apparatus; and
a transmission unit configured to transmit the required time notification signal to the base station apparatus, and
the required time is a time after the transmission unit is configured to transmit the required time notification signal until the terminal apparatus is configured to receive a control signal transmitted from the base station apparatus.

16. A base station apparatus for performing radio communication with a terminal apparatus, the base station apparatus comprising:
a reception unit configured to receive from the terminal apparatus a required time notification signal indicating a required time to allow the terminal apparatus to process a change of a radio transmission bandwidth or a radio reception bandwidth for the terminal apparatus, and
the required time is a time after the terminal apparatus is configured to transmit the required time notification signal until the terminal apparatus is configured to receive a control signal transmitted from the base station apparatus.

17. A radio communication method in a radio communication system for performing radio communication between a base station apparatus and a terminal apparatus, the method comprising:
generating a required time notification signal indicating a required time to allow the terminal apparatus to process a change of a radio transmission bandwidth or a radio reception bandwidth to the base station apparatus, and transmitting the required time notification signal, by the terminal apparatus; and
receiving the required time notification signal by the base station apparatus, wherein
the required time is a time after the terminal apparatus is configured to transmit the required time notification signal until the terminal apparatus is configured to receive a control signal transmitted from the base station apparatus.

18. A radio communication system comprising:
a base station apparatus; and
a terminal apparatus, wherein
the base station apparatus and terminal apparatus perform radio communication, the terminal apparatus includes:
a memory unit configured to store a required time to allow the terminal apparatus to process a change of a radio transmission bandwidth or a radio reception bandwidth to the base station apparatus in advance,
the base station apparatus includes:
a control unit configured to control to transmit at least one of a data and control signal to the terminal apparatus after the required time has elapsed, without transmitting the data and control signal to the terminal apparatus during the required time, and
the required time is a time after the terminal apparatus is configured to transmit a required time notification signal indicating the required time until the terminal apparatus is configured to receive at least one of the data and control signal transmitted from the base station apparatus.

19. A base station apparatus in a radio communication system for performing radio communication between the base station apparatus and a terminal apparatus, the base station apparatus comprising:
a control unit configured to control to transmit at least one of a data and control signal to the terminal apparatus after a required time to allow the terminal apparatus to process a change of a radio transmission bandwidth or a radio reception bandwidth of the terminal apparatus has elapsed, without transmitting the data and control signal to the terminal apparatus during the required time, wherein
the required time is a time after the terminal apparatus is configured to transmit a required time notification signal indicating the required time until the terminal apparatus is configured to receive at least one of the data and control signal transmitted from the base station apparatus.

20. A terminal apparatus in a radio communication system for performing radio communication between a base station apparatus and the terminal apparatus, the terminal apparatus comprising:
a memory unit configured to store a required time to allow the terminal apparatus to process a change of a radio transmission bandwidth or a radio reception bandwidth in advance; and
a reception unit configured to receive at least one of a data and control signal transmitted from the base station apparatus after the required time has elapsed, wherein
the required time is a time after the terminal apparatus is configured to transmit a required time notification signal indicating the required time until the terminal apparatus is configured to receive at least one of the data and control signal.

* * * * *